(12) United States Patent  
Matsuzaka et al.

(10) Patent No.: US 7,796,280 B2
(45) Date of Patent: Sep. 14, 2010

(54) IMAGE PRINTING USING ORDER SHEET

(75) Inventors: Kenji Matsuzaka, Nagano-ken (JP); Ayahiro Nakajima, Nagano-ken (JP); Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1003 days.

(21) Appl. No.: 11/582,494

(22) Filed: Oct. 16, 2006

(65) Prior Publication Data

US 2007/0086069 A1 Apr. 19, 2007

(30) Foreign Application Priority Data

Oct. 18, 2005 (JP) ............... 2005-303023
Aug. 21, 2006 (JP) ............... 2006-223768

(51) Int. Cl.
*G06F 15/00* (2006.01)
*G06F 3/12* (2006.01)
*G06K 1/00* (2006.01)
*H04N 1/60* (2006.01)

(52) U.S. Cl. ................. 358/1.13; 358/1.9
(58) Field of Classification Search .......... 359/1.9, 359/1.1, 1.13, 1.14, 1.15, 1.6, 1.18
See application file for complete search history.

(56) References Cited

U.S. PATENT DOCUMENTS 6,084,728 A * 7/2000 Itoh et al. ............. 360/3

FOREIGN PATENT DOCUMENTS

| JP | 2004-255729 | 9/2004 |
| JP | 2005-111802 | 4/2005 |
| JP | 2005-117328 | 4/2005 |
| JP | 2005-125730 | 5/2005 |
| JP | 2005-138573 | 6/2005 |

* cited by examiner

*Primary Examiner*—Douglas Q Tran
(74) *Attorney, Agent, or Firm*—Nutter McClennen & Fish LLP; John J. Penny, V

(57) ABSTRACT

A printing method for printing an image based on image data, the printing method includes: loading the image data from a storage medium in which the image data is stored; printing an order sheet, wherein the order sheet includes an index image representing the loaded image data to receive from a user entry of information for printing the image; recognizing the information entered in the order sheet via scanning of the printed order sheet; and printing a corrected image made by executing image correction to the image based on the recognized entered information.

18 Claims, 29 Drawing Sheets

Fig.4

ORDER SHEET

- ○ PHOTO PAPER— L SIZE
- ○ PHOTOGRAPHIC PAPER-2L SIZE
- ⬭ PHOTOGRAPHIC PAPER-CARD
- ○ PHOTO PAPER— POSTCARD ENTIRE SURFACE
- ○ PHOTO PAPER— A4
- ○ FORMAT PAPER— A4

DATA NAME:GD0110
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0111
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0112
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0113
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0114
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0115
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

Fig.6

ORDER SHEET

- ● PHOTO PAPER— L SIZE  ○ PHOTOGRAPHIC PAPER-2L SIZE
- ○ PHOTOGRAPHIC PAPER-CARD  ○ PHOTO PAPER— POSTCARD ENTIRE SURFACE
- ○ PHOTO PAPER— A4  ○ FORMAT PAPER— A4

DATA NAME:GD0110
NUMBER OF PRINTS
① ● ③
BRIGHTNESS ○ ● ○ ○ ○
HUE ○ ○ ● ○ ○
SHARPNESS ○ ○ ○ ○ ●
HIGH  NORMAL  LOW

DATA NAME:GD0111
NUMBER OF PRINTS
① ● ②  ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0112
NUMBER OF PRINTS
① ② ●
BRIGHTNESS ○ ○ ● ○ ○
HUE ○ ○ ○ ○ ○
SHARPNESS ● ○ ○ ○ ○
HIGH  NORMAL  LOW

DATA NAME:GD0113
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0114
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0115
NUMBER OF PRINTS
● ② ③
BRIGHTNESS ○ ○ ○ ● ○
HUE ○ ○ ○ ○ ○
SHARPNESS ○ ○ ○ ○ ○
HIGH  NORMAL  LOW

Fig.9

ORDER SHEET

- ○ PHOTO PAPER— L SIZE    ○ PHOTOGRAPHIC PAPER-2L SIZE
- ○ PHOTOGRAPHIC PAPER-CARD  ○ PHOTO PAPER— POSTCARD ENTIRE SURFACE
- ○ PHOTO PAPER— A4    ○ FORMAT PAPER— A4

DATA NAME:GD0210
NUMBER OF PRINTS
① ② ③
BRIGHTNESS / HUE / SHARPNESS
HIGH  NORMAL  LOW

DATA NAME:GD0211
NUMBER OF PRINTS
① ② ③
BRIGHTNESS / HUE / SHARPNESS
HIGH  NORMAL  LOW

DATA NAME:GD0212
NUMBER OF PRINTS
① ② ③
BRIGHTNESS / HUE / SHARPNESS
HIGH  NORMAL  LOW

DATA NAME:GD0213
NUMBER OF PRINTS
① ② ③
BRIGHTNESS / HUE / SHARPNESS
HIGH  NORMAL  LOW

DATA NAME:GD0214
NUMBER OF PRINTS
① ② ③
BRIGHTNESS / HUE / SHARPNESS
HIGH  NORMAL  LOW

DATA NAME:GD0215
NUMBER OF PRINTS
① ② ③
BRIGHTNESS / HUE / SHARPNESS
HIGH  NORMAL  LOW

Fig.23

ORDER SHEET

- PHOTO PAPER— L SIZE  ○ PHOTOGRAPHIC PAPER-2L SIZE
- PHOTOGRAPHIC PAPER-CARD  ○ PHOTO PAPER- POSTCARD ENTIRE SURFACE
- PHOTO PAPER— A4  ○ FORMAT PAPER— A4

○ CHECK/MODIFY BEFORE PRINTING

DATA NAME:GD0110
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0111
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0112
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0113
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0114
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

DATA NAME:GD0115
NUMBER OF PRINTS
① ② ③
BRIGHTNESS ○ ○ ○ ○ ○
HUE ○ ○ ○ ○ ○
SHARPNESS ○ ○ ○ ○ ○
HIGH  NORMAL  LOW

IMAGE PRINTING USING ORDER SHEET

CROSS-REFERENCES TO RELATED APPLICATION

This application relates to and claims priority from the following identified Japanese Patent Applications, the entire disclosures of which are incorporated by reference herein.
1. Japanese Patent Application No. P2005-303023, filed on Oct. 18, 2005
2. Japanese Patent Application No. P2006-223768, filed on Aug. 21, 2006

BACKGROUND

1. Technical Field

The present invention relates to an image printing technology that prints images.

2. Related Art

Image printing technologies include those in which, when image data stored on a storage medium is to be printed using a printing apparatus, image printing is realized based on the image data using an order sheet on which are printed marking space areas that receive instructions regarding the number of printed copies, the paper size or the like using an index image that represents the image data. Such image printing technologies are disclosed in the patent references JP-A-2004-255729, JP-A-2005-111802, JP-A-2005-117328, JP-A-2005-125730 and JP-A-2005-138573.

SUMMARY

However, in the image printing technologies, insufficient consideration has been given to the correction of images to be printed using an order sheet.

An advantage of some aspects of the invention is to provide an image printing technology by which the convenience of image printing using an order sheet can be improved.

A apparatus according to an aspect of the invention is a printing apparatus that prints images based on image data and includes an image reader that reads image data from a storage medium on which such image data is stored, an order sheet printing controller that executes control to print an order sheet having entry areas that receive user input of information used for printing of images using index images representing the read image data, a scanning/recognition unit that scans the order sheet and recognizes entry information entered in the entry areas, and a correction/printing controller that performs control to execute printing of corrected images comprising images that have been subjected to image correction based on the recognized entry information. As a result, the user of the printing apparatus can carry out on the printing apparatus using an order sheet requests related to image processing to be performed to images to print. Therefore, the convenience of image printing using an order sheet can be improved. Here, the types of image correction performed based on the recognized entry information may include at least one of the following types: contrast correction, sharpness correction, brightness correction, color temperature correction, color density correction, tone correction, red-eye correction, or trimming correction.

The printing apparatus described above may take the following forms. For example, it is acceptable if the order sheet printing controller includes an image quality evaluation unit that evaluates the image quality level of the image based on the image data and the image quality level obtained as a result of the evaluation is indicated on the printed order sheet. In this case, the printing apparatus user can execute on the printing apparatus a request related to image processing using the order sheet after taking into consideration the image quality level indicated on the order sheet. The image quality level subjected to evaluation may comprise an image quality level based on at least one of such evaluation items as blur, wobble, degree of exposure or noise.

It is acceptable if the entry areas in the printed order sheet have multiple marking spaces representing the levels of image correction, the scan recognition unit includes a mark recognition unit that recognizes as entry information marks entered in the marking spaces, and the correction/printing controller performs control to execute printing of a corrected image that has undergone image correction according to the correction levels reflecting the marking spaces in which a mark is recognized. As a result, the user of the printing apparatus can specify the correction levels for the image to be printed using an order sheet.

It is furthermore acceptable if the image data includes exposure status data that indicates the exposure status, i.e., the status present at the time of exposure to capture the image, and the printed order sheet indicates the results after image correction based on the exposure status data has been carried out to the image. In this case, the user of the printing apparatus can adjust the image correction based on the exposure status data using the order sheet. It is also acceptable if the exposure status data comprises Exif data. In such a case, the printing apparatus can execute appropriate printing correction based on such information as the exposure mode, white balance, shutter speed, aperture and the like pertaining to the digital still camera used.

It is additionally acceptable if the index images include various sample images that are obtained by carrying out various forms of image correction to the original image, each entry area on the printed order sheet has multiple marking space areas corresponding to each sample image, the scanning/recognition unit includes a mark recognition unit that recognizes marks entered in the marking spaces as entry information, and the correction/printing controller performs control to execute printing of a corrected image that can be obtained by subjecting the original image to image correction to which the sample image corresponding to the marking space in which a mark is recognized was subjected. In this case, the user of the printing apparatus can select the type and degree of image correction with reference to the sample images.

It is furthermore acceptable if each entry area in the printed order sheet has multiple marking space areas corresponding to types of image correction, the scan recognition unit includes a mark recognition unit that recognizes as entry information marks entered in the marking spaces, and the correction/printing controller performs control to execute printing of a corrected image comprising the index image subjected to image correction of the types indicated by marking spaces in which a mark is recognized. In this case, the user of the printing apparatus can specify the types of image correction using an order sheet. Furthermore, in this case, it is also acceptable if the printing apparatus includes a correction level receiving unit that receives from the user the selection of the correction level for each type of image correction to be performed to the image prior to printing of the corrected image. In this case, the user of the printing apparatus can instruct to the printing apparatus the correction level of each type of image correction after the types of image correction are specified using an order sheet.

It is furthermore acceptable if the scanning/recognition unit includes an image mark recognition unit that recognizes as entry information marks entered on an index image, and the correction/printing controller includes a correction area specification unit that specifies areas on the image corresponding to the areas indicated by the recognized marks in the index image as the areas on the image to which image correction should be performed based on the recognized entry information. In this case, the user of the printing apparatus can specify correction areas on the image using an order sheet.

It is furthermore acceptable if the correction/printing controller performs printing the corrected image immediately after the order sheet is scanned and the entry information is recognized. In this case, the user of the printing apparatus can obtain printing of corrected images using a simple procedure.

It is furthermore acceptable if the printing apparatus includes a display unit that displays the corrected image prior to printing thereof and a modification receiving unit that receives from the user modifications to the corrected image prior to the printing thereof. In this case, the user of the printing apparatus can obtain a printing of an image to which desired image correction is carried out by instructing modifications to such image correction while checking the image to which image correction has been performed.

It is furthermore acceptable if the correction/printing controller includes a modification determination unit that determines, based on the recognized entry information and prior to printing of the corrected image, whether or not modifications to the corrected image are to be received from the user. In this case, the user of the printing apparatus can decide whether or not he will make modifications to the corrected image using an order sheet.

The invention is not limited to the form of a printing apparatus, and may be applied, for example, in a printing method for printing an image via a printing apparatus based on image data, a program for realizing via the computer of a printing apparatus the function of printing an image based on image data, or a computer system that includes a personal computer, printing apparatus and scanning device. Furthermore, the invention is not limited to the forms described above, and may naturally be realized in various forms that fall within the essential scope thereof.

BRIEF DESCRIPTION OF THE DRAWINGS

The invention will be described with reference to the accompanying drawings, wherein like numbers reference like elements, and in which:

FIG. 4 is an explanatory drawing showing an example of an order sheet 910 printed by the printing apparatus 10 of the first embodiment;

FIG. 6 is an explanatory drawing showing an example of the order sheet 910 of FIG. 4 on which information used to print the image is entered by the user in the first embodiment;

FIG. 9 is an explanatory drawing showing an example of an order sheet 920 printed by the printing apparatus 10 of the second embodiment;

FIG. 23 is an explanatory drawing showing an example of an order sheet 970 printed by the printing apparatus 10 of the seventh embodiment;

DESCRIPTION OF EXEMPLARY EMBODIMENTS

In order to further clarify the construction and operation of the invention described above, the image printing technology applied in the invention below will now be described according to the following sequence.

A. First embodiment (Specification of correction levels)
  A-1. Construction of printing apparatus
  A-2. Operation of printing apparatus
B. Second embodiment (Presentation of image quality level)
C. Third embodiment (Presentation of type and degree of correction based on exposure status data)
D. Fourth embodiment (Presentation of set of sample images)
E. Fifth embodiment (Specification of types of correction)
F. Sixth embodiment (Specification of correction areas)
G. Seventh embodiment (Modification of correction levels)
H. Eighth embodiment (Specification of types of correction for sample image)
I. Other embodiments

A. First Embodiment (Specification of Correction Levels)

A-1. Construction of Printing Apparatus

Figure 1:
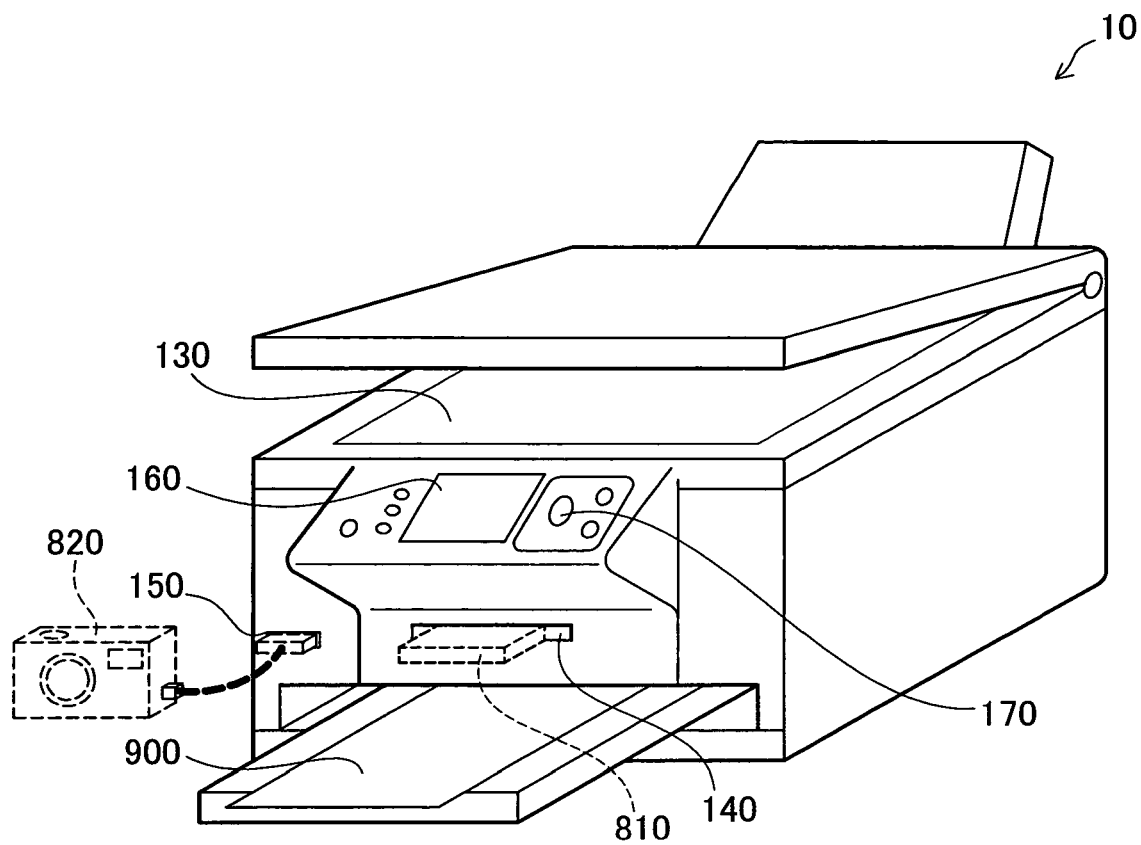
FIG. 1 is a perspective drawing showing the external configuration of a printing apparatus 10.
Figure 2:
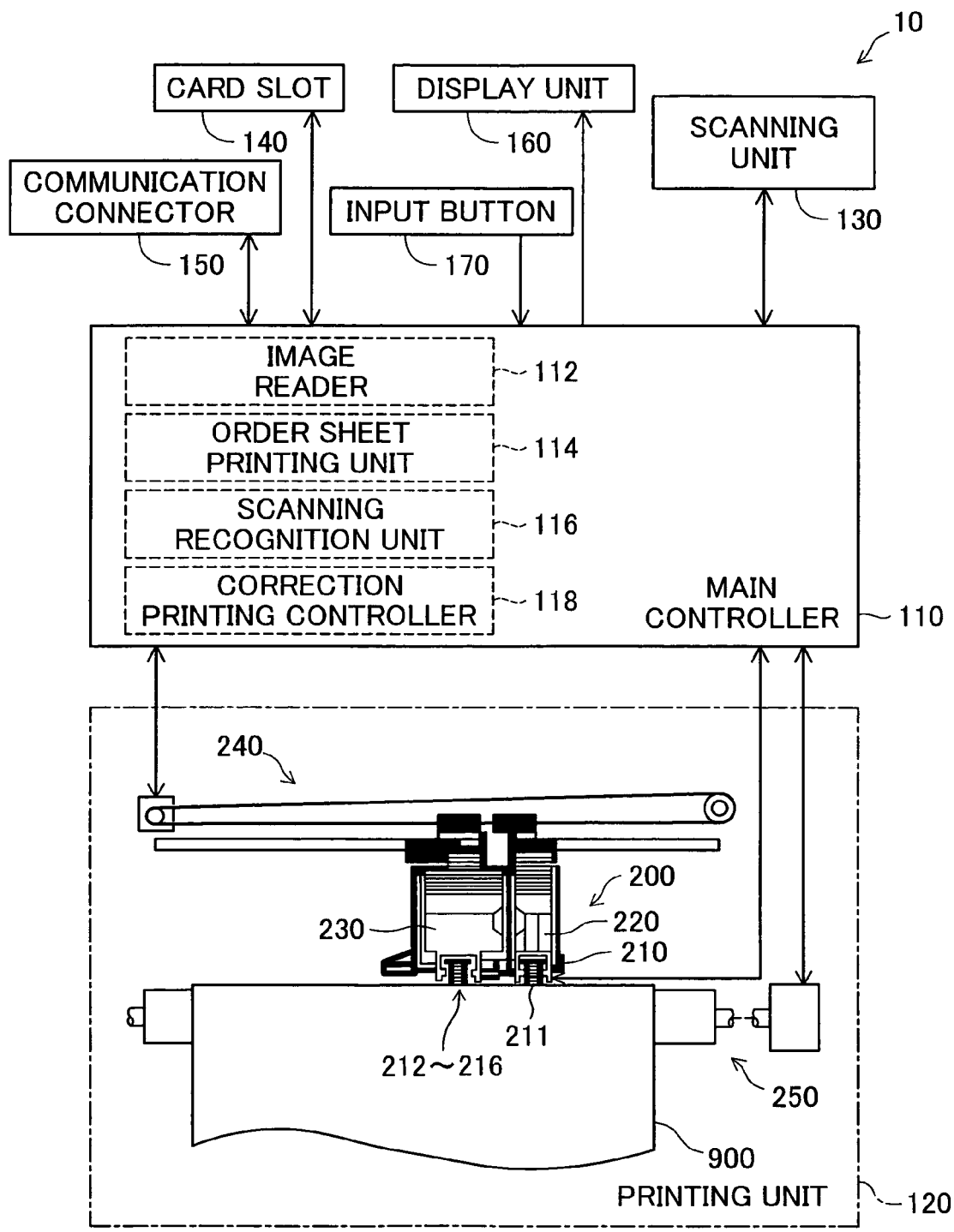
FIG. 2 is an explanatory drawing showing the internal configuration of the printing apparatus 10.

FIG. 1 is a perspective drawing showing the external configuration of a printing apparatus 10. FIG. 2 is an explanatory drawing showing the internal configuration of the printing apparatus 10. The printing apparatus 10 shown in FIGS. 1 and 2 is a so-called multifunction peripheral, i.e., an apparatus that combines such functions as those of a color printer, monochrome printer, scanner and copier. The printing apparatus 10 also has, in addition to these functions, an order sheet printing function comprising a function by which images stored on a storage medium connected to the printing apparatus 10 are printed using an order sheet.

The printing apparatus 10 includes a main controller 110 that controls the various components of the printing apparatus 10, a printing unit 120 that performs printing onto a printing medium 900 such as normal paper, photo paper or a postcard, a scanning unit 130 that performs scanning, i.e., reads images on paper and converts them to digital data, a card slot 140 that can read from and write data to a storage medium 810 such as a memory card containing an internal flash memory, a communication connector 150 that can exchange data with an external device 820 that contains an internal storage medium, such as a personal computer, a digital still camera or a digital video camera, a display unit 160 that displays letters and images, and an input button 170 that receives instruction input from the user of the printing apparatus 10.

The main controller 110 of the printing apparatus 10 includes an image reader 112 that reads out image data from the storage medium 810 connected to the card slot 140 or the external device 820 connected to the communication connector 150, an order sheet printing controller 114 that controls the printing of an order sheet that receives from the user entry of information used to print images based on read-out image data, a scanning/recognition unit 116 that scans the order sheet and recognizes the entry information entered by the user, and a correction/printing controller 118 that performs control to print corrected images comprising original images that have undergone image correction based on the recognized entry information.

In this embodiment, the main controller 110 comprises an ASIC (Application-Specific Integrated Circuit) that incorporates hardware such as a central processing unit (CPU), a read-only memory (ROM) and a random-access memory (RAM), and software to realize the functions of the image reader 112, the order sheet printing controller 114, the scanning/recognition unit 116 and the correction/printing controller 118 is installed in the main controller 110. The operation of the main controller 110 will be described in detail below.

The printing unit 120 of the main controller 110 includes a print head unit 210 that discharges printing ink onto the printing medium 900, a carriage 200 on which the print head unit 210 is mounted, a carriage driver 240 that drives the carriage 200 in the main scanning directions, and a printing medium feeder 250 that feeds the printing medium 900, as shown in FIG. 2. The print head unit 210 of the printing unit 120 has a total of six ink discharge heads 211-216, one for each of the ink colors of black, cyan, light cyan, magenta, light magenta and yellow. Each of the ink discharge heads 211-216 discharges ink onto the printing medium 900 via the voltage adjustment of a piezoelectric element (not shown). The ink discharge heads 211-216, carriage driver 240 and printing medium feeder 250 of the printing unit 120 achieve printing onto the printing medium 900 by being moved in tandem based on instructions from the main controller 110.

A-2. Operation of Printing Apparatus

Figure 3:
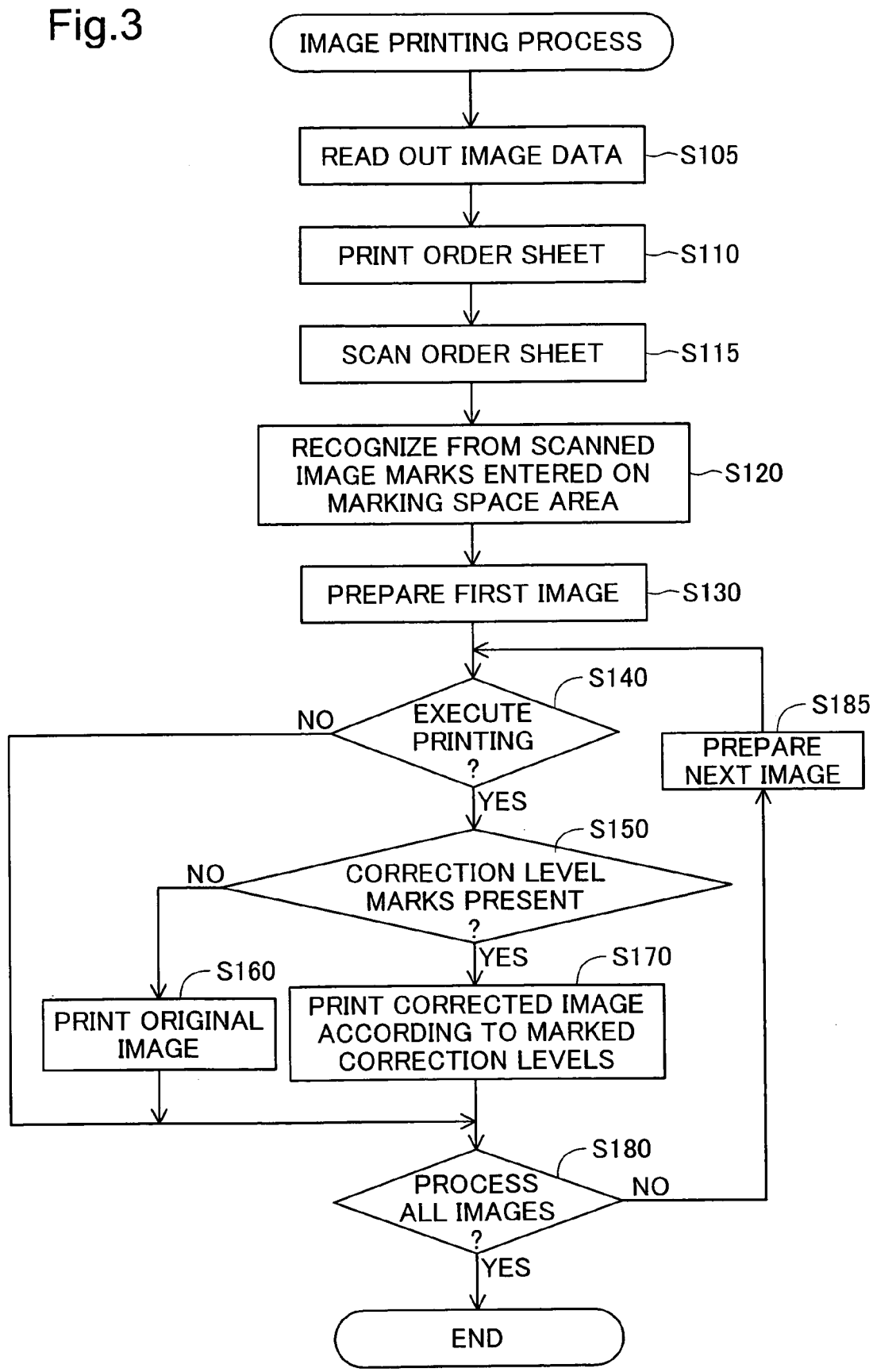
FIG. 3 is a flow chart showing an image printing process carried out by the main controller 110 of the printing apparatus 10 in a first embodiment.

FIG. 3 is a flow chart showing an image printing process executed by the main controller 110 of the printing apparatus 10 of the first embodiment. The main controller 110 of the printing apparatus 10 begins the image printing process of FIG. 3 when the storage medium 810 or external device 820 is mounted in the card slot 140 or to the communication connector 150 and a command to execute the order sheet printing function is entered by the user via the input button 170.

When the image printing process of FIG. 3 is begun, the main controller 110 of the printing apparatus 10 reads out image data from the storage medium 810 or external device 820 mounted to the card slot 140 or communication connector 150 (step S105). The main controller 110 then instructs the printing unit 120 to perform printing of an order sheet based on the read-out image data (step S110), based on which an order sheet is printed.

FIG. 4 is an explanatory drawing showing an example of an order sheet 910 printed by the printing apparatus 10 of the first embodiment. The order sheet 910 shown in FIG. 4 has a printing paper specification area 9110 comprising a receiving area to receive user entry of information used to specify the type of printing paper on which images are to be printed based on the image data, as well as a printing style specification area 9120 comprising a receiving area to receive user entry of information used to specify the style of printing for each image based on the image data.

The printing paper specification area 9110 of the order sheet 910 has multiple marking spaces 9112 that correspond to multiple types of printing paper and receive user entry in order to specify the type of printing paper on which images are to be printed based on image data. In this embodiment, the multiple marking spaces 9112 are blank ovals. In this embodiment, each of the multiple marking spaces 9112 is followed by text indicating the type of printing paper associated with that marking space. In the example shown in FIG. 4, in order to indicate the types of printing paper corresponding to each of the multiple marking spaces 9112, the text 'Photo paper—L size' indicating photo paper to realize photo-quality printing on L-size paper, the text 'Photo paper—2L size' indicating 2L-size photo paper, the text 'Photo paper—Card' indicating card-sized photo paper, the text 'Photo paper/Postcard all' indicating postcard-sized photo paper, the text 'Photo paper—A4' indicating A4-sized photo paper and the text 'Format paper—A4' indicating the default selection of A4-sized printing paper are shown respectively after each marking space.

Figure 5:
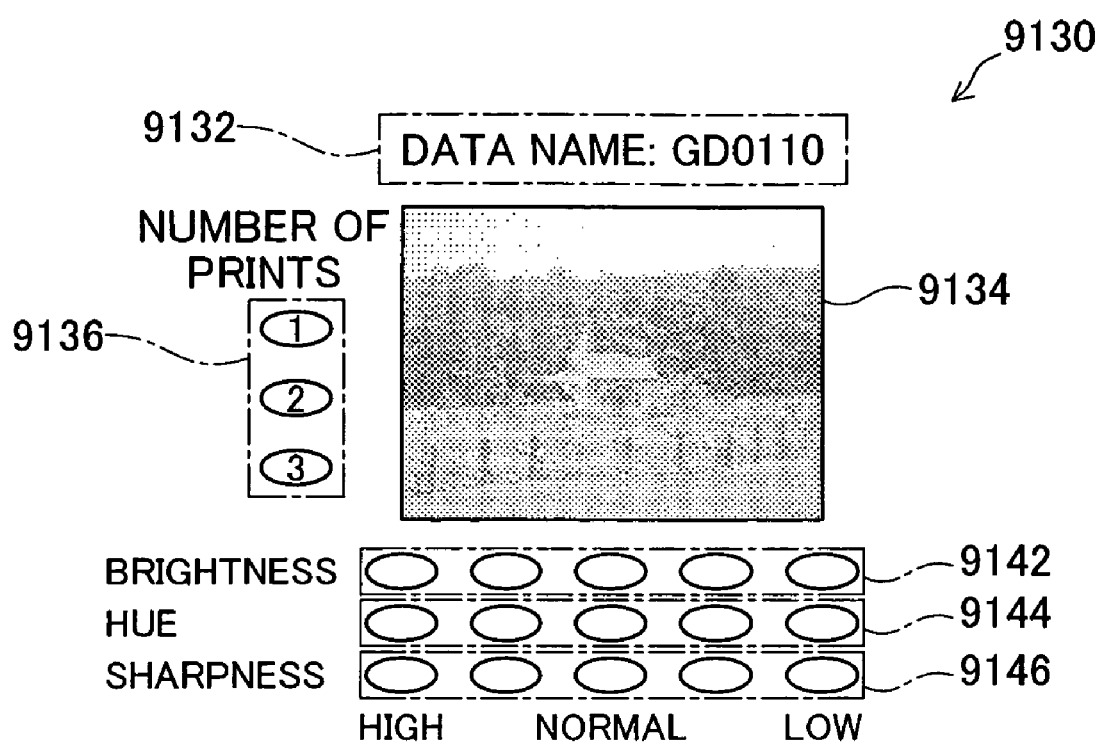
FIG. 5 is an explanatory drawing showing an enlargement of an entry area 9130 of the order sheet 910 shown in FIG. 4.

The printing style specification area 9120 on the order sheet 910 has entry areas 9130 that receive from the user the entry of information used to specify the printing style for each image based on the image data. FIG. 5 is an explanatory drawing showing an enlargement of an entry area 9130 on the order sheet 910 shown in FIG. 4. Each entry area 9130 of the order sheet 910 has a data name 9132 comprising an identifier to identify the name of the read-out image data item, an index image 9134 indicating an image based on such image data, a marking space area 9136 that receives user entry to specify the number of prints of the image to be printed based on this image data, a marking space area 9142 that receives user entry to specify the correction level for 'Brightness' to be carried out to the image to be printed, a marking space area 9144 that receives user entry to specify the correction level for 'Hue' to be carried out to the image to be printed, and a marking space area 9146 that receives user entry to specify the correction level for 'Sharpness' to be carried out to the image to be printed.

The image quality of the index image 9134 in the entry area 9130 is identical in this embodiment to that of the image printed normally based on the image data. In this embodiment, the marking space area 9136 of the entry area 9130 contains three blank ovals aligned vertically, and the numbers '1', '2' and '3' are shown in the center of these ovals, respectively, in order to receive specification to indicate whether '1', '2' or '3' prints are to be printed.

In this embodiment, the marking space areas 9142, 9144, 9146 each comprise five blank ovals that are aligned horizontally. The text 'High' is indicated below the leftmost of the five ovals for the marking space areas 9142, 9144, 9146, the text 'Normal' is indicated below the center of the five ovals for these marking space areas, and the text 'Low' is indicated below the rightmost of these five ovals. In this way, five different correction levels for each of the marking space areas 9142, 9144, 9146 may be received.

Figure 7:
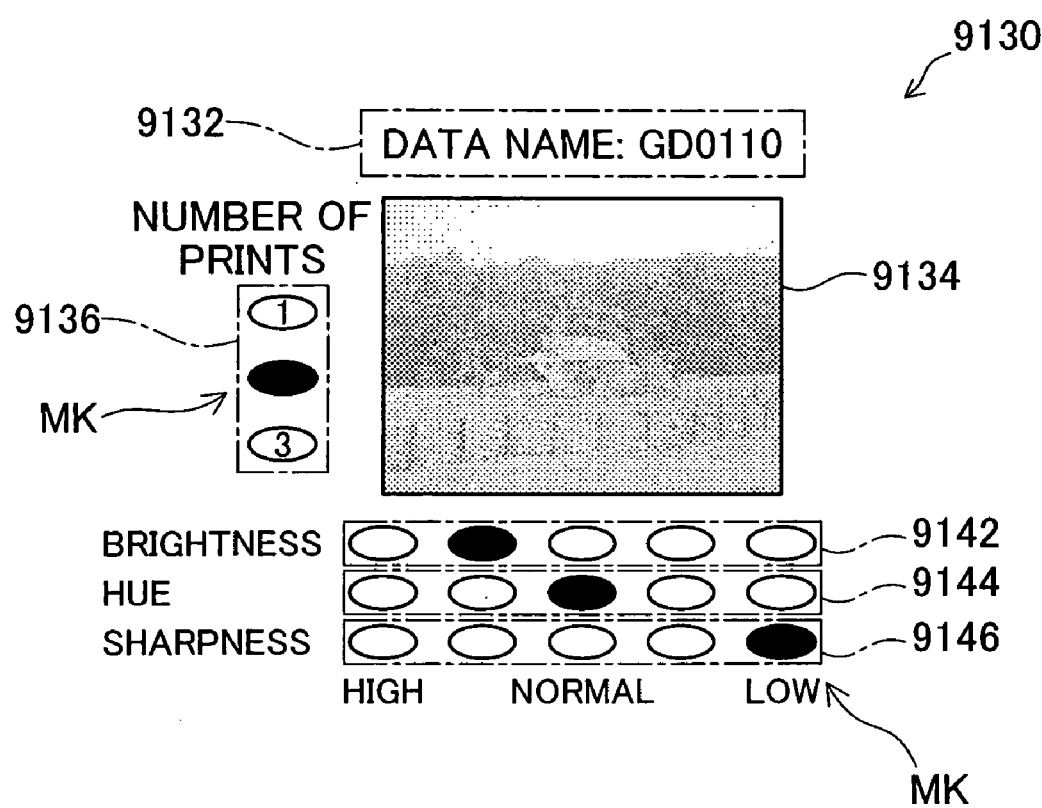
FIG. 7 is an explanatory drawing showing an enlargement of the entry area 9130 on the order sheet 910 shown in FIG. 6.

FIG. 6 is an explanatory drawing showing an example of the order sheet 910 of FIG. 4 on which information used to print images is entered by the user in this embodiment. FIG. 7 is an explanatory drawing showing an enlargement of an entry area 9130 of the order sheet 910 shown in FIG. 6. The order sheet 910 of FIG. 6 has, as information entered by the user in order to print the images, a mark MK comprising a blacking out of one of the multiple marking spaces 9112 in the printing paper specification area 9110 and marks MK comprising the blacking out of various marking spaces in the multiple marking space areas 9136, 9142, 9144, 9146 in the printing style specification area 9120.

In the example shown in FIG. 5, a mark MK is entered in the marking space 9112 corresponding to 'Photo paper—L size' in the printing paper specification area 9110. Within the printing style specification area 9120 shown in FIG. 5, in the entry area 9130 pertaining to the data name 'GD0110' shown in FIG. 7, a mark MK is entered in the oval containing the number '2' in the marking space area 9136 that receives specification of the number of prints, a mark MK is entered in the second oval from the left in the marking space area 9142 that receives specification of the correction level for 'Brightness', a mark MK is entered in the center oval in the marking space area 9144 that receives specification of the correction level for 'Hue', and a mark MK is entered in the rightmost oval in the marking space area 9146 that receives specification of the correction level for 'Sharpness'.

Returning to FIG. 3, after the order sheet 910 shown in FIG. 4 is printed (step S110), the order sheet 910 shown in FIG. 6 is set in the scanning unit 130 of the printing apparatus 10 by the user, and when a request for scanning of the order sheet 910 shown in FIG. 6 is input by the user via the input button 170, the main controller 110 of the printing apparatus 10 obtains from the scanning unit 130 a scanned image comprising the scanned order sheet 910 resulting from the issuance of an instruction to the scanning unit 130 to scan the set order sheet 910 (step S115).

The main controller 110 then recognizes, within the scanned image obtained from the scanning unit 130, the mark MK entered in the marking space 9112 contained in the printing paper specification area 9110 as well as the marks MK entered in the marking space areas 9136, 9142, 9144, 9146 contained in the printing style specification area 9120 (step S120). The recognition of the marks MK may be realized via analysis of the color differences between the printed order sheet 910 and the scanned order sheet 910, or via extraction of a specific color on the scanned order sheet 910.

After each mark MK is recognized from the scanned image (step S120), the main controller 110 determines, after preparation for printing of the initial image according to the sequence shown on the order sheet 910 (step S130), whether or not the prepared image is to be printed (step S140). In this embodiment, where a mark MK is recognized in the marking space area 9136 that receives specification of the number of prints, it is determined that the prepared image will be printed.

Where it is determined that the prepared image is to be printed (step S140), the main controller 110 determines whether or not marks MK are recognized in the marking space areas 9142, 9144, 9146 that receive specification of the correction levels for the various types of image correction (step S150).

Where it is determined that marks MK are recognized in the marking space areas 9142, 9144, 9146 (step S150), the main controller 110 instructs the printing unit 120 to print on the printing paper specified in the printing paper specification area 9110, and using the number of prints specified in the marking space area 9136, the corrected image according to the image correction levels for which marks MK were recognized in connection with the prepared image (step S170).

In this embodiment, where marks are not present in one or more of the marking space areas 9142, 9144, 9146 as shown in the entry areas 9130 for the data names 'GD0112' and 'GD0115' in the order sheet 910 shown in FIG. 6, image correction is carried out only for those types of correction for which a mark MK is present. In this embodiment, the types of image correction received using the marking space areas 9142, 9144, 9146 and the correction levels thereof are set in advance, but it is acceptable if the types of image correction and the correction levels thereof vary according to the characteristic amounts of the image data to which image correction is carried out (such as the average value, mode value, dynamic range, edge amount or diffusion amount).

Returning to FIG. 3, where it is recognized that no marks MK are present in the marking space areas 9142, 9144, 9146 (step S150), the main controller 110 instructs the printing unit 120 to print the original image drawn directly from the read-out image data on the printing paper specified in the printing paper specification area 9110 according to the number of prints specified in the marking space 9136 (step S155). After the above processing is carried out as to all images shown on the order sheet 910 (steps S180, S185), the main controller 110 ends the image printing process shown in FIG. 3.

According to the image printing technology of the first embodiment described above, the user of the printing apparatus 10 can issue to the printing apparatus an instruction for image processing of images to be printed using the order sheet 910. Therefore, the convenience of image printing using the order sheet 910 can be improved. Furthermore, because marking space areas 9142, 9144, 9146 to receive entry of the correction levels for the various types of image correction are present on the order sheet 910, the user of the printing apparatus 10 can specify the correction levels applicable to the images to be printed using the order sheet 910.

B. Second Embodiment (Presentation of Image Quality Level)

The construction and operation of the printing apparatus 10 of a second embodiment are identical to the construction and operation of the printing apparatus 10 of the first embodiment, except that images are printed using an order sheet in which the image quality level for each of the images to be printed is shown.

Figure 8:
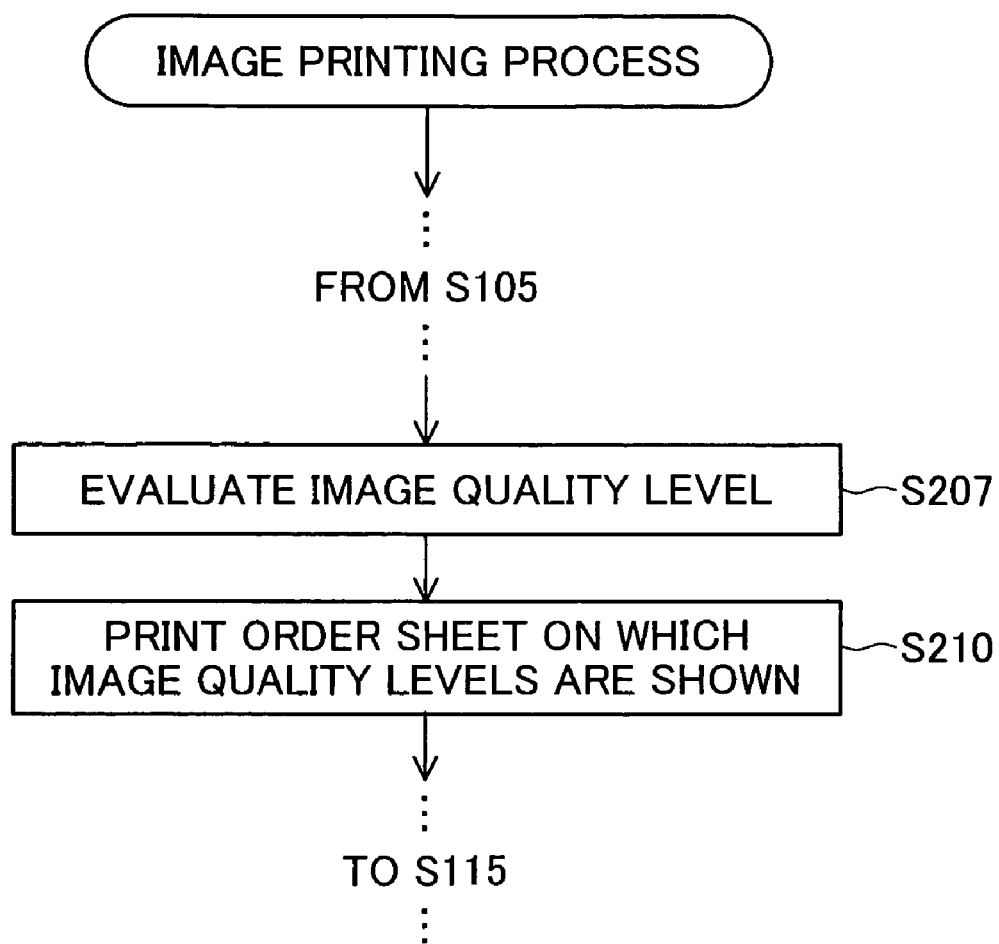
FIG. 8 is a flow chart showing an image printing process executed by the main controller 110 of the printing apparatus 10 of a second embodiment.

FIG. 8 is a flow chart showing the image printing process executed by the main controller 110 of the printing apparatus 10 of the second embodiment. After the image data is read out in the same manner as in the first embodiment (step S105), the main controller 110 of the printing apparatus 10 analyzes the read-out image data and evaluates the image quality level of the image (step S207). When the image quality level is evaluated, the characteristic amounts regarding the image data (such as the average value, mode value, dynamic range, edge amount or diffusion amount) are calculated, and such factors as blur, wobble, exposure amount and noise are evaluated as determinants of the image quality level of that image based on the calculated characteristic amounts.

After the image quality level is evaluated (step S207), the main controller 110 instructs the printing unit 120 to print an order sheet on which the evaluated image quality levels are shown (step S210).

FIG. 9 is an explanatory drawing showing an example of an order sheet 920 printed by the printing apparatus 10 of the second embodiment. Like the order sheet 910 of the first embodiment, the order sheet 920 of the second embodiment has a printing paper specification area 9210 comprising a receiving area to receive user entry of information used to specify the type of printing paper on which images are to be printed based on the image data, as well as a printing style specification area 9220 comprising a receiving area to receive user entry of information used to specify the style of printing for each image based on the image data, but it differs from the order sheet 910 in that the image quality level is indicated in each entry area 9230 of the printing style specification area 9220.

Figure 10:
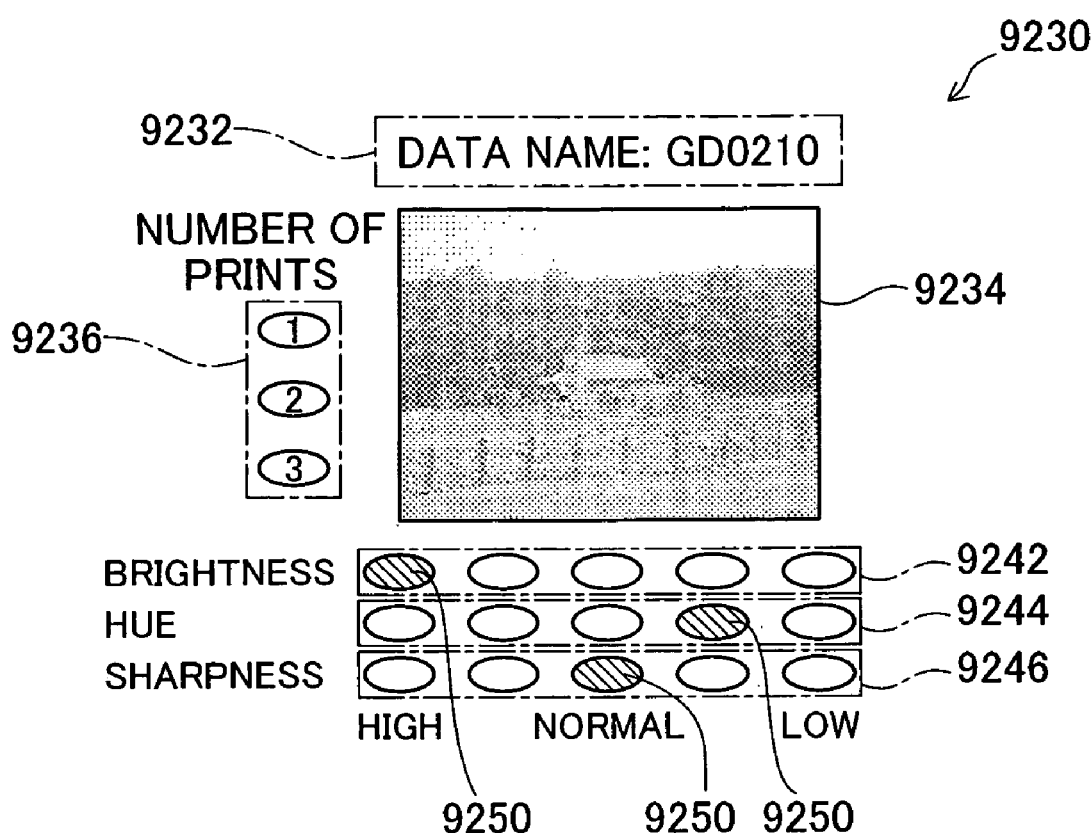
FIG. 10 is an explanatory drawing showing an enlargement of an entry area 9230 of the order sheet 920 shown in FIG. 9.

FIG. 10 is an explanatory drawing showing an enlargement of an entry area 9230 of the order sheet 920 shown in FIG. 9. Like the entry area 9130 of the first embodiment, the entry area 9230 of the order sheet 920 has a data name 9232 comprising an identifier to identify the name of each read-out image data item, an index image 9234 indicating an image based on such image data item, and a marking space area 9236 that receives user entry to specify the number of the number of prints of the image to be printed based on this image data, as well as marking space areas 9242, 9244, 9246 that receive specification of the correction levels for image correction to be carried out to the image to be printed, but it differs from the entry area 9130 of the first embodiment in that the image quality level of the original image is indicated in the marking space areas 9242, 9244, 9246.

In this embodiment, the evaluated image quality level is converted into evaluation values corresponding to correction levels for image correction represented in the marking space areas 9242, 9244, 9246, and a current value mark 9250 that indicates the converted evaluation value are entered in the marking space areas 9242, 9244, 9246 to indicate the correction levels corresponding to these evaluation values. The current value marks 9250 are printed in a color that enables such marks to be clearly distinguished from marks MK during recognition of the marks MK (step S120). In the example shown in FIG. 10, a current value mark 9250 is entered in the leftmost oval indicating the 'High' level in the marking space area 9242 corresponding to the image quality level for 'Brightness', a current value mark 9250 is entered in the second oval from the right in the marking space area 9244 corresponding to the image quality level for 'Hue', and a current value mark 9250 is entered in the center oval indicating the 'Normal' level in the marking space area 9246 corresponding to the image quality level for 'Sharpness'. In this embodiment, the index image 9234 is the original image drawn directly from the read-out image data.

Returning to FIG. 8, after the order sheet 920 shown in FIG. 9 is printed (step S210), the main controller 110 executes the processing including and following the scanning of the order sheet 920 (step S115) in the same manner as in the image printing process of FIG. 3 in connection with the first embodiment.

According to the image printing technology of the second embodiment described above, the user of the printing apparatus 10 can instruct the printing apparatus 10 to perform image processing of images to be printed using the order sheet 920. In addition, because current value marks 9250 expressing the current image quality level are shown in the marking space areas 9142, 9144, 9146 of the order sheet 920, the user of the printing apparatus 10 can instruct the printing apparatus 10 to perform image processing based on the order sheet 920 with reference to the image quality levels indicated thereon. Therefore, the convenience of image printing using the order sheet 910 can be improved.

C. Third Embodiment (Presentation of Form of Correction Based On Exposure Status Data)

The construction and operation of the printing apparatus 10 of the third embodiment are identical to the construction and operation of the printing apparatus 10 of the first embodiment, except that the images are printed using an order sheet on which the form of image correction based on exposure status data included in the image data is shown.

Figure 11:
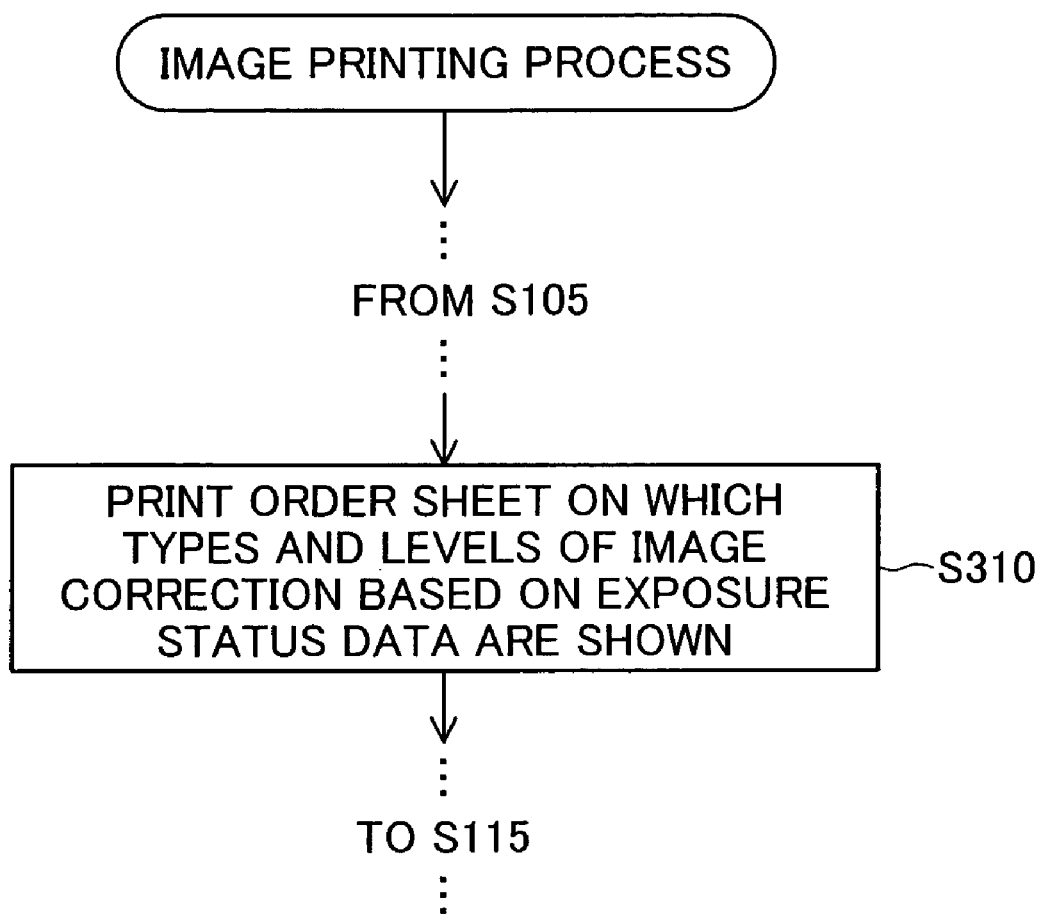
FIG. 11 is a flow chart showing an image printing process executed by the main controller 110 of the printing apparatus 10 of a third embodiment.

FIG. 11 is a flow chart showing the image printing process executed by the main controller 110 of the printing apparatus 10 of the third embodiment. After the image data is read out in the same manner as in the first embodiment (step S105), the main controller 110 of the printing apparatus 10 instructs the printing unit 120 to print an order sheet on which the form of image correction based on the exposure status data included in the read-out image data is shown (step S310).

Figure 12:
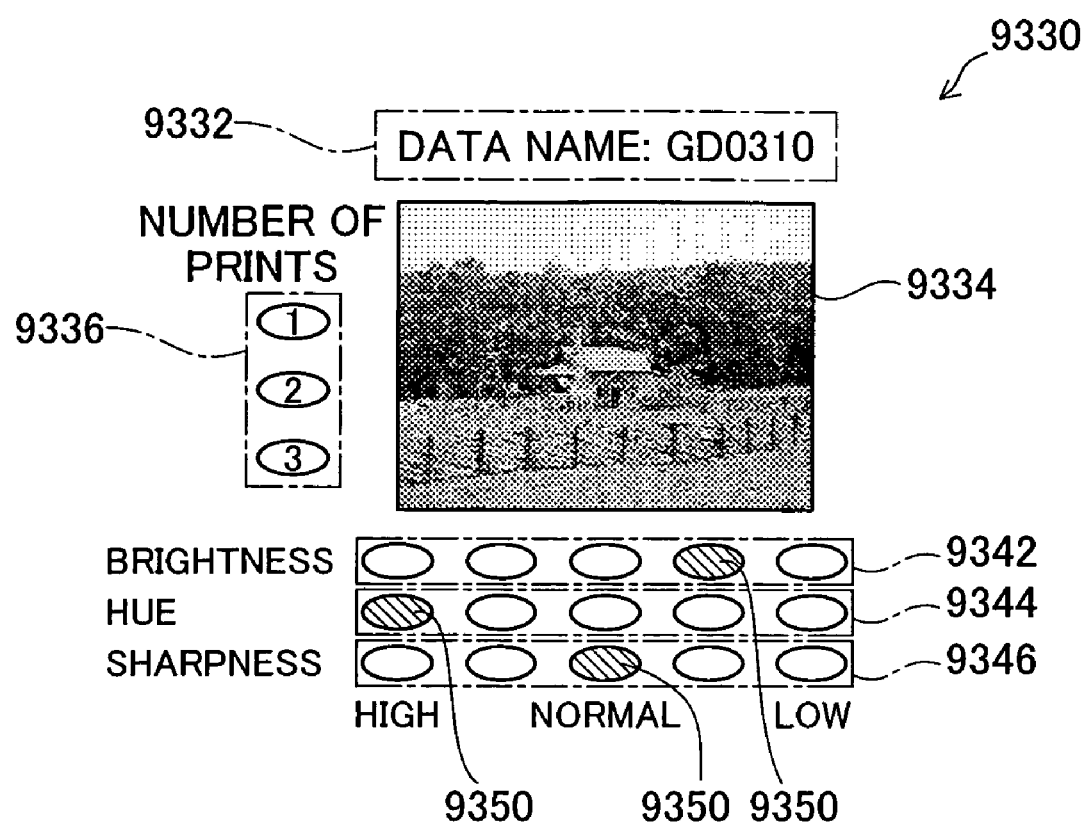
FIG. 12 is an explanatory drawing showing the entry area 9330 of the order sheet of the third embodiment.

FIG. 12 is an explanatory drawing showing an entry area 9330 of the order sheet of the third embodiment. Like the entry area 9130 of the first embodiment, the entry area 9330 of the order sheet of the third embodiment has a data name 9332 comprising an identifier to identify the name of each read-out image data item, an index image 9334 indicating an image based on such image data item, and a marking space area 9336 that receives user entry to specify the number of the number of prints of the image to be printed based on this image data, as well as marking space areas 9342, 9344, 9346 that receive specification of the correction levels for image correction to be carried out to the image to be printed, but it differs from the entry area 9130 of the first embodiment in that the index image 9334 is an image that has undergone image correction based on exposure status data included in the image data and the form of image correction that has been performed to this index image 9334 is shown in the marking space areas 9242, 9244, 9246.

In this embodiment, the exposure status data included in the image data is Exif (Exchangeable Image File Format) data, and in the case of a digital still camera, such information as the exposure mode, the white balance, the shutter speed and the aperture value are included in the exposure status data as exposure-related information pertaining to the image data. In this embodiment, the main controller 110 executes image correction according to the exposure status data based on a preset standard.

In this embodiment, a correction value mark 9350 indicating the correction level for image correction carried out to the index image 9334 is formed in the marking space areas 9342, 9344, 9346 used to indicate such correction level. The correction value marks 9350 are printed in a color that enables such marks to be clearly distinguished from marks MK during recognition of marks MK. In the example shown in FIG. 12, a correction value mark 9350 is entered in the second oval from the right indicating the 'Lower' level in the marking space area 9342 corresponding to the image correction level for 'Brightness', a correction value mark 9350 is entered in the leftmost oval indicating 'High' in the marking space area 9344 corresponding to the image correction level for 'Hue', and a correction value mark 9350 is entered in the center oval indicating the 'Normal' level in the marking space area 9346 corresponding to the image correction level for 'Sharpness'.

Returning to FIG. 11, after the order sheet is printed (step S310), the main controller 110 performs processing including and following scanning of the order sheet (step S115) in the same manner as during the image printing process of FIG. 3 in connection with the first embodiment.

According to the image printing technology of the third embodiment described above, the user of the printing apparatus 10 can request that the printing apparatus 10 perform image processing of images to be printed using the order sheet 920. In addition, because current value marks 9250 expressing the current image quality level are formed in the marking space areas 9342, 9344, 9346 of the entry areas 9330 of the order sheet, the user of the printing apparatus 10 can instruct the printing apparatus 10 to adjust the image correction based on the exposure status data using the order sheet. Therefore, the convenience of image printing using the order sheet 910 can be improved.

D. FOURTH Embodiment (Presentation of Set of Sample Images)

The construction and operation of the printing apparatus 10 of a fourth embodiment are identical to the construction and operation of the printing apparatus 10 of the first embodiment, except that images are printed using an order sheet on which a set of sample images comprising the original image subjected to various types and levels of image correction are performed is shown.

Figure 13:
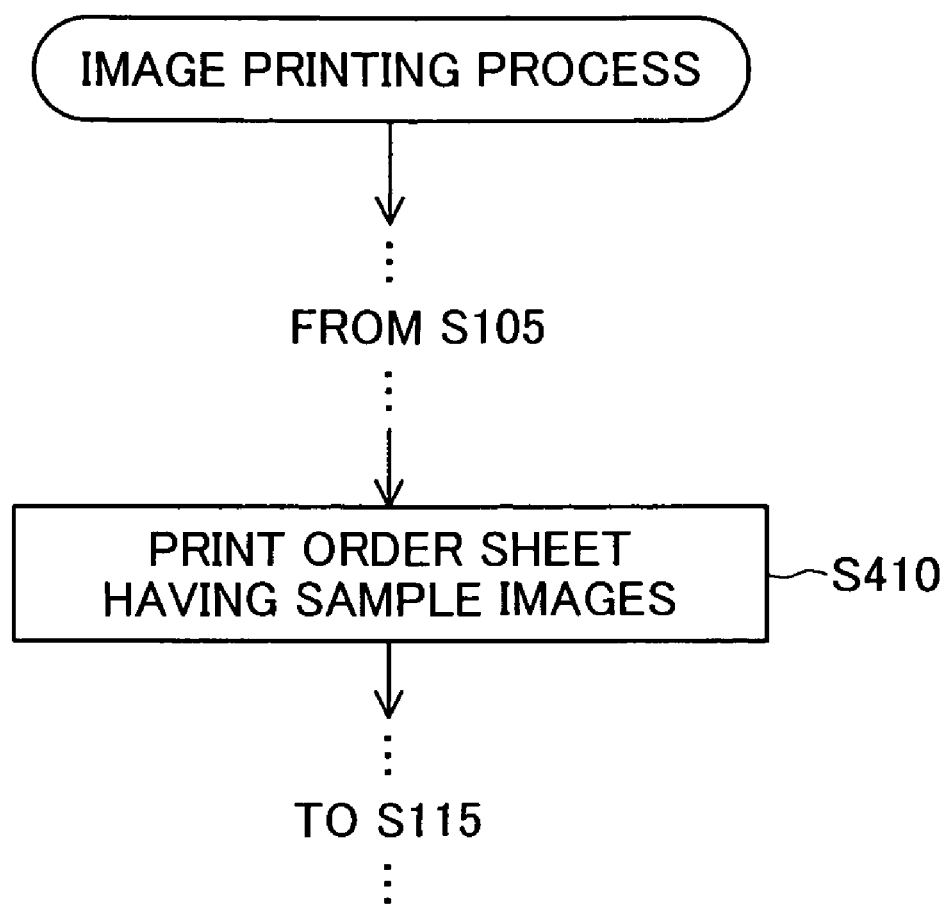
FIG. 13 is a flow chart showing an image printing process executed by the main controller 110 of the printing apparatus 10 of a fourth embodiment.

FIG. 13 is a flow chart showing an image printing process executed by the main controller 110 of the printing apparatus 10 of the fourth embodiment. After the image data is read out in the same manner as in the first embodiment (step S105), the main controller 110 of the printing apparatus 10 instructs the printing unit 120 to print an order sheet on which is shown sets of sample images comprising images based on the read-out image data to which various types and levels of image correction have been performed (step S410).

Figure 14:
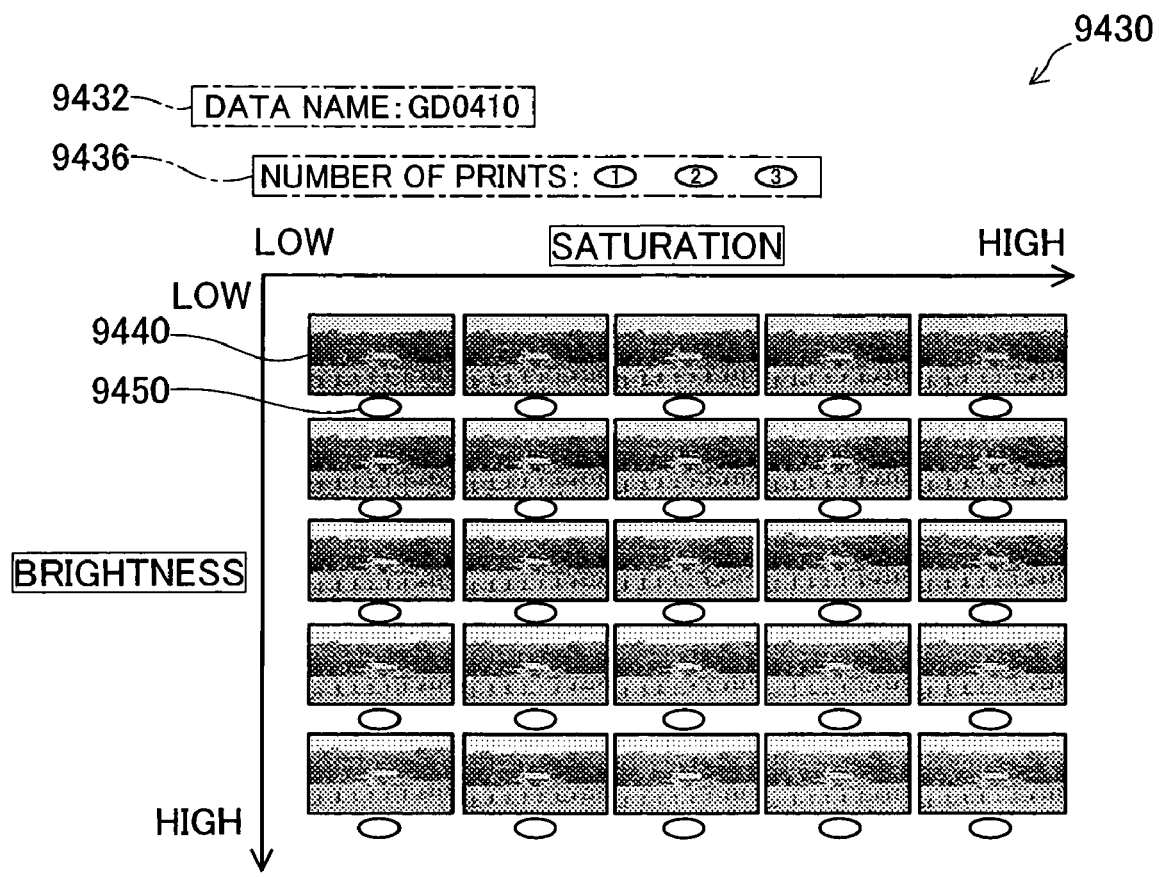
FIG. 14 is an explanatory drawing showing an entry area 9430 of the order sheet of the fourth embodiment.

FIG. 14 is an explanatory drawing showing an entry area 9430 of the order sheet of the fourth embodiment. The entry area 9430 of the order sheet of the fourth embodiment, like the entry area 9130 of the first embodiment, has a data name 9432 comprising an identifier to identify the name of each read-out image data item and a marking space area 9436 that receives user entry to specify the number of prints of the image to be printed based on this image data, but differs from the entry area 9130 of the first embodiment in that it also has a set of sample images 9440 comprising the image based on the read-out image data that has been subjected to various types and levels of image correction, as well as marking spaces 9450 corresponding to the sample images 9440.

In the example of FIG. 14, the set of sample images 9440 is configured in a 5×5 matrix, such that a total of 25 sample images 9440 are shown. With respect to the type of image correction applicable to each sample image 9440, the correction level for 'Hue' image correction increases as one moves rightward in each row of sample images, while the correction level for 'Brightness' image correction increases as one moves downward in each column of sample images.

Figure 15:
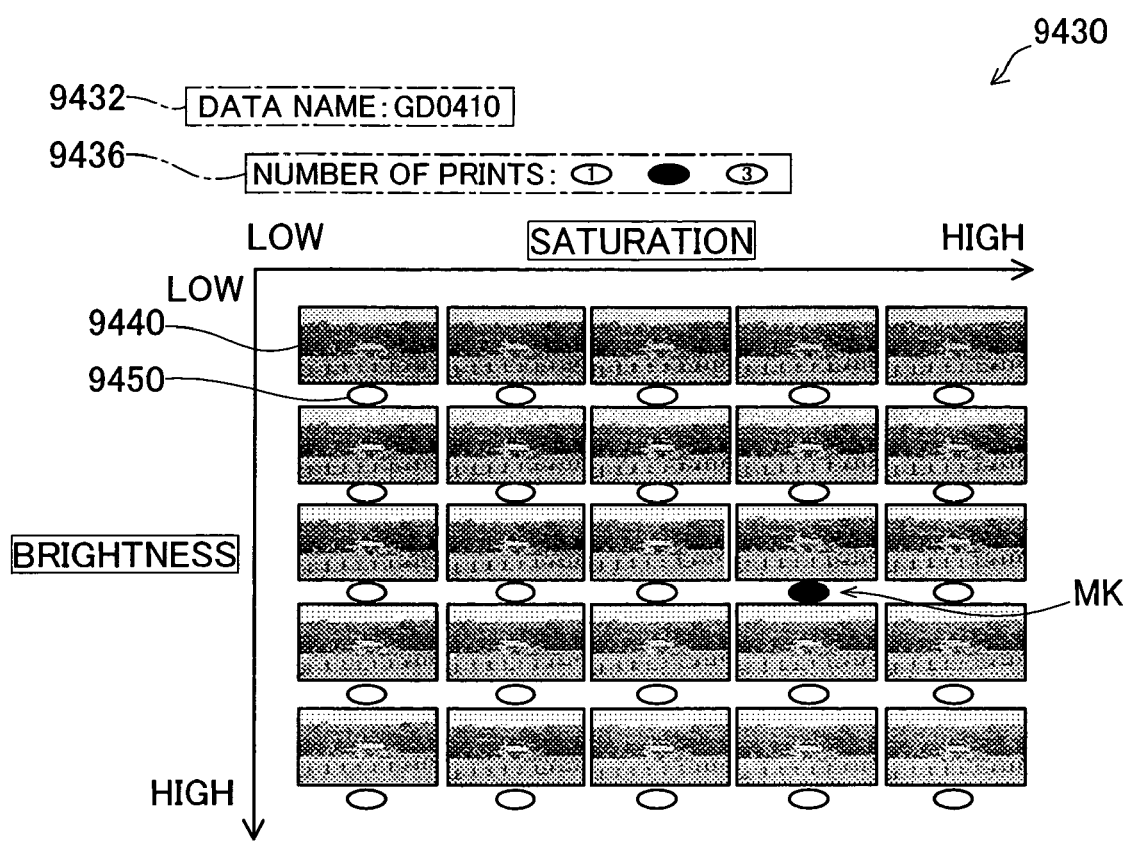
FIG. 15 is an explanatory drawing showing the entry area 9430 shown in FIG. 14 in which information used to print an image has been entered by the user.

FIG. 15 is an explanatory drawing showing the entry area 9430 of FIG. 14 in which information used to print an image is entered by the user. In the example of FIG. 15, a mark MK indicating that two prints are to be printed is entered in the marking space area 9136 that receives specification of the number of prints to be printed, and a mark MK indicating the image in the third row, fourth column of the set of sample images 9440 is entered in the marking space 9450 that receives the specification of the type and level of correction applicable to the image to be printed. In this case, the main controller 110 of the printing apparatus 10 prints two prints of a corrected image that has undergone correction according to the correction levels corresponding to the third row, fourth column of the set of sample images (step S170).

According to the image printing process of the fourth embodiment described above, the user of the printing apparatus 10 can request that the printing apparatus 10 perform image processing of images to be printed using an order sheet. In addition, because the order sheet entry area 9430 has sets of sample images indicating various combinations of correction types and levels as well as marking spaces 9450 corresponding to these sample images 9440, the user of the printing apparatus 10 can select the types and levels of image correction with reference to the sample images. Therefore, the convenience of image printing using the order sheet 910 can be improved.

E. Fifth Embodiment (Specification of Types of Correction)

The construction and operation of the printing apparatus 10 of a fifth embodiment are identical to the construction and operation of the printing apparatus 10 of the first embodiment, except that specification of the correction levels is received from the user after the correction types are specified via the order sheet.

Figure 16:
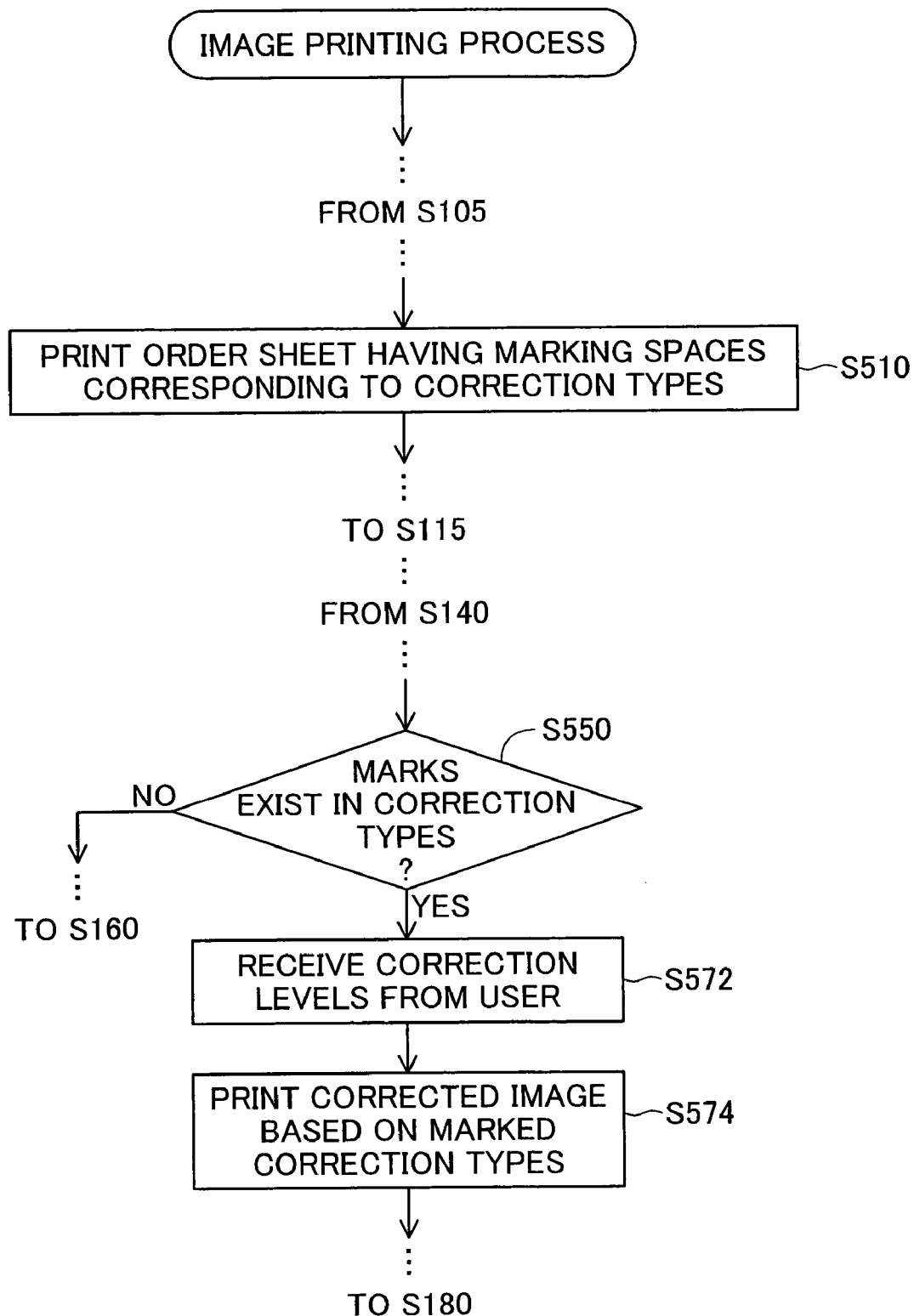
FIG. 16 is a flow chart showing an image printing process executed by the main controller 110 of the printing apparatus 10 of a fifth embodiment.

FIG. 16 is a flow chart showing an image printing process executed by the main controller 110 of the printing apparatus 10 of the fifth embodiment. After the image data is read out in the same manner as in the first embodiment (step S105), the main controller 110 of the printing apparatus 10 instructs the printing unit 120 to print an order sheet that receives specification of the types of image correction to be carried out based on the read-out image data (step S510).

Figure 17:
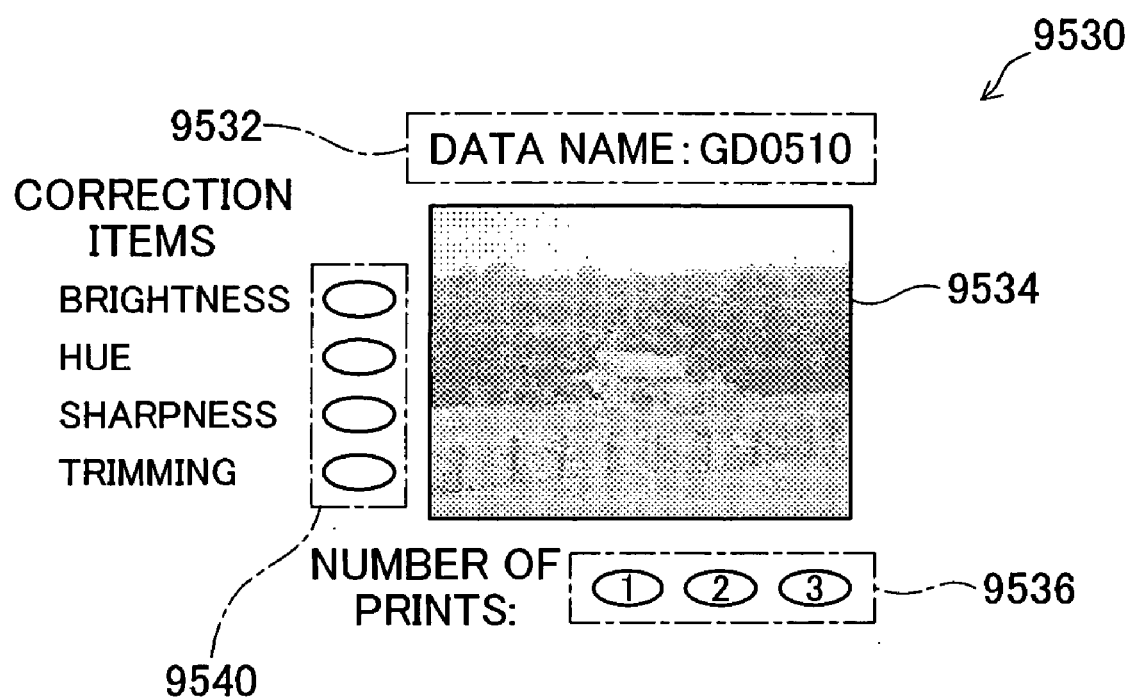
FIG. 17 is an explanatory drawing showing an entry area 9530 of the order sheet of the fifth embodiment.

FIG. 17 is an explanatory drawing showing the entry area 9530 of the order sheet of the fifth embodiment. Like the entry area 9130 of the order sheet of the first embodiment, the entry area 9530 of the order sheet of the fifth embodiment has a data name 9532 comprising an identifier to identify the name of the read-out image data item, an index image 9534 that indicates the image based on the image data and a marking space area 9536 that receives specification of the number of prints of the image to be printed based on the image data, but it differs from the entry area 9130 of the order sheet of the first embodiment in that instead of the marking space areas 9142, 9144, 9146 that receive specification of correction levels, it has a marking space area 9540 that receives specification of the types of image correction to be performed to the image to be printed. In the example of FIG. 17, the marking space area 9540 that receives specification of the types of image correction comprises four ovals corresponding to the four types of image correction 'Brightness', 'Hue', 'Sharpness' and 'Trimming'.

Figure 18:
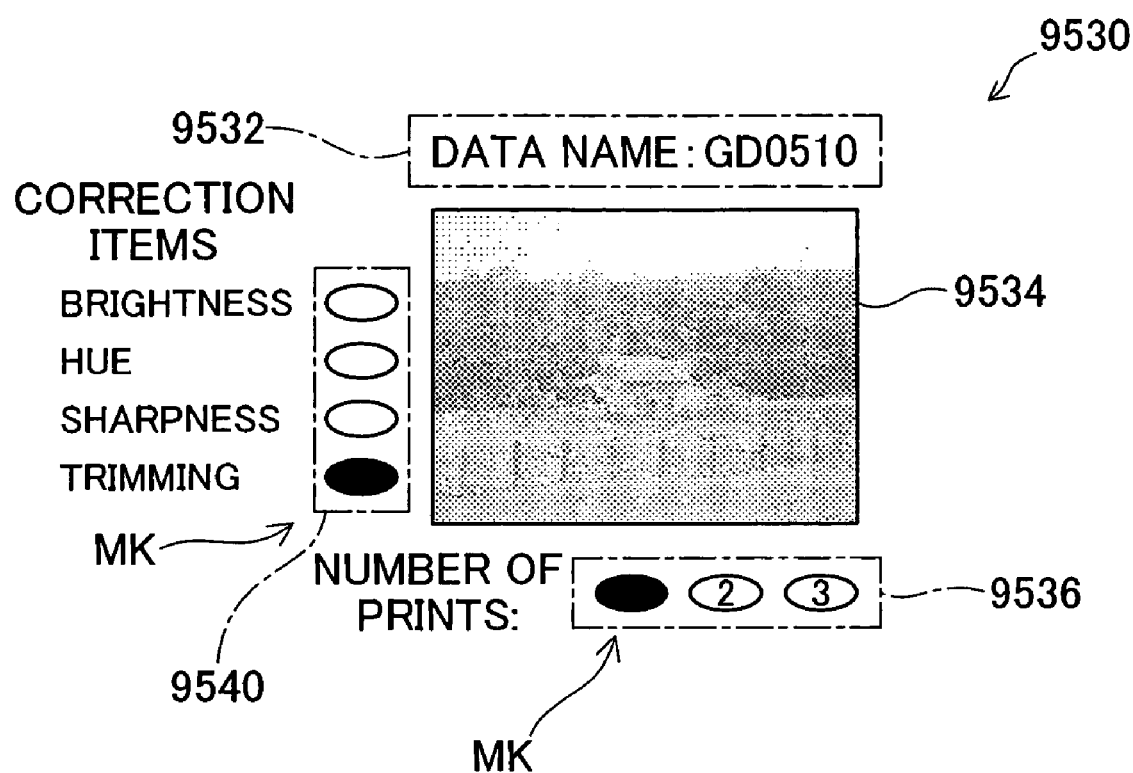
FIG. 18 is an explanatory drawing showing the entry area 9530 shown in FIG. 17 in which information used to print an image has been entered by the user.

FIG. 18 is an explanatory drawing showing the entry area 9530 of FIG. 17 in which information used to print the image is entered. In the example of FIG. 15, a mark MK indicating one print is entered in the marking space area 9536 that receives specification of the number of prints, while a mark MK indicating 'Trimming' is entered as the type of image correction in the marking space area 9540.

Returning to FIG. 16, when it is decided that the prepared image is to be printed (step S140), the main controller 110 determines whether or not one or more marks MK is recognized in the marking space area 9540 that receives specification of the types of image correction (step S550). If it is determined that one or more marks MK is recognized in the marking space area 9540 (step S550), the main controller 110 displays on the display unit 160 a screen used to receive from the user specification of the correction level regarding each type of image correction represented by the mark(s) MK entered in the marking space area 9540 and receives from the user via the input button 170 specification of the correction level(s), correction areas or the like (step S572). The main controller 110 then performs printing of the corrected image that underwent the type(s) of image correction represented by the mark(s) MK entered in the marking space area 9540 according to the correction level(s) received from the user (step S574).

According to the image printing process of the fifth embodiment described above, the user of the printing apparatus 10 can request that the printing apparatus 10 perform image processing of images to be printed using an order sheet. In addition, the user of the printing apparatus 10 can specify the types of image correction using the order sheet. Furthermore, after specifying the types of image correction using the order sheet, the user of the printing apparatus 10 can issue an instruction to the printing apparatus 10 regarding the correction level for each specified type of image correction. Therefore, the convenience of image printing using the order sheet 910 can be improved.

F. Sixth Embodiment (Specification of Correction Areas)

The construction and operation of the printing apparatus 10 of a sixth embodiment are identical to the construction and operation of the printing apparatus 10 of the first embodiment, except that specification regarding the areas to be corrected on the image can be received using an order sheet.

Figure 19:
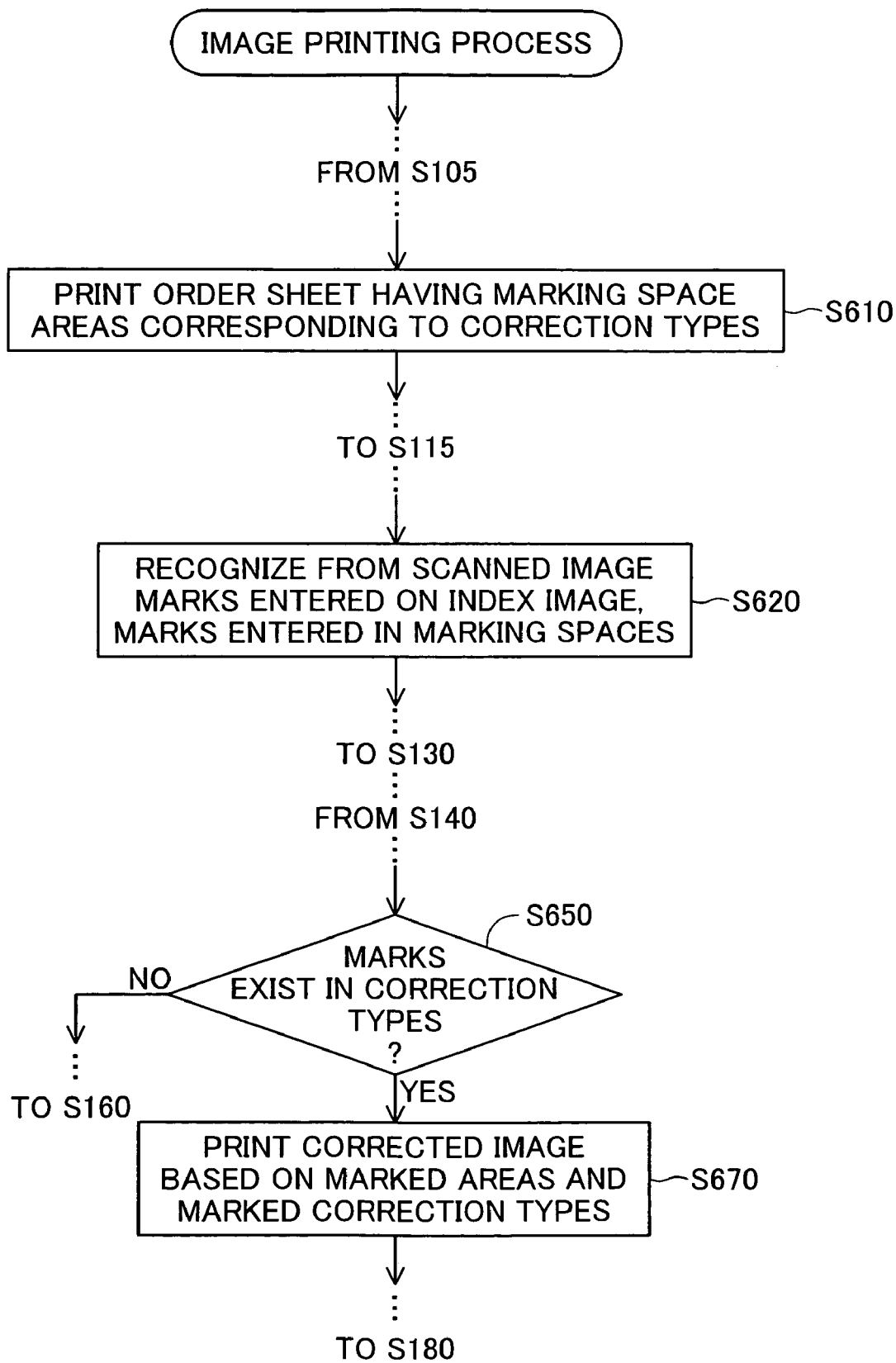
FIG. 19 is a flow chart showing an image printing process executed by the main controller 110 of the printing apparatus 10 of a sixth embodiment.

FIG. 19 is a flow chart showing an image printing process executed by the main controller 110 of the printing apparatus 10 of the sixth embodiment. After the image data is read out in the same manner as in the first embodiment (step S105), the main controller 110 of the printing apparatus 10 instructs the printing unit 120 to print an order sheet that receives specification of the types of image correction to be performed to the image drawn based on the read-out image data (step S610).

Figure 20:
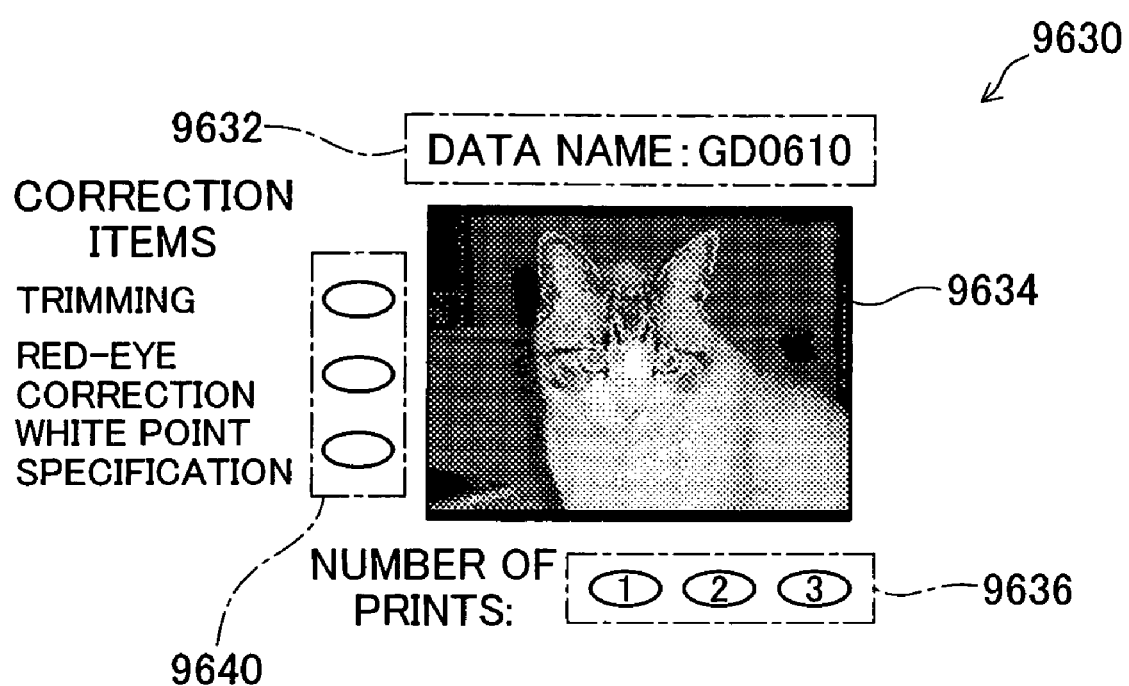
FIG. 20 is an explanatory drawing showing an entry area 9630 of the order sheet of the sixth embodiment.

FIG. 20 is an explanatory drawing showing an entry area 9630 of the order sheet of the sixth embodiment. Like the entry area 9130 of the first embodiment, the entry area 9630 of the order sheet of the sixth embodiment has a data name 9632 indicating an identifier for the image data, an index image that indicates the image based on the image data, and a marking space area that receives specification of the number of prints of the image to be printed based on the image data, but it differs from the entry area 9130 of the order sheet of the first embodiment in that instead of the marking space areas 9142, 9144, 9146 that receive specification of correction levels, it has a marking space area 9640 that receives specification of the types of image correction to be performed to the image to be printed. In the example of FIG. 20, the marking space area 9640 that receives specification of the types of image correction comprises three ovals that are aligned vertically and correspond to the three types of image correction 'Trimming', 'Red-eye Correction', and 'White point specification', respectively.

Figure 21:
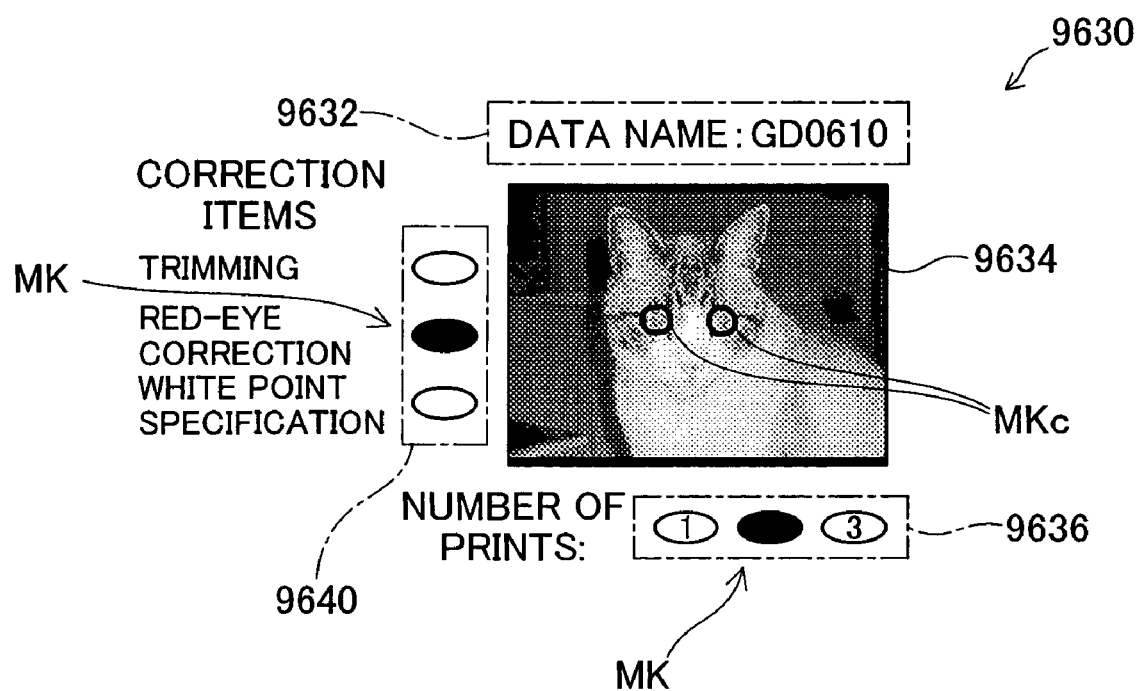
FIG. 21 is an explanatory drawing showing the entry area 9630 shown in FIG. 20 in which information used to print an image has been entered by the user.

FIG. 21 is an explanatory drawing showing the entry area 9630 of FIG. 20 in which information used to print the image is entered by the user. In the example of FIG. 21, a mark MK indicating two prints is entered in the marking space area 9636 that receives specification of the number of prints, a mark MK indicating 'Red-eye correction' is entered as the type of image correction in the marking space area 9640 that receives specification of the types of image correction, and round marks MKc that surround the correction areas on the image that are to undergo 'Red-eye correction' are entered directly onto the index image 9634. In the example of FIG. 21, the marks MKc surround both eyes in the image shown in the index image 9634. The marks MKc are not limited to a circular configuration, and the marks MKc may have a rectangular configuration, for example, such as where 'Trimming' is selected as the type of image correction.

Returning to FIG. 19, after the order sheet is scanned (step S115), the main controller 110 recognizes the marks MK entered in the various marking spaces and the marks MKc entered on the index image 9634 (step S620). The marks MKc may be recognized via analysis of the color differences between the printed order sheet and the scanned order sheet, or via extraction of a specific color on the scanned order sheet.

When it is decided to print the prepared image (step S140), the main controller 110 determines whether or not one or more marks MK are recognized in the marking space area 9640 that receives specification of the types of image correction (step S650). If it is determined that one or more marks MK are recognized in the marking space area 9640 (step S650), the main controller 110 prints the corrected image comprising the index image 9634 that has undergone image correction corresponding to the mark(s) MK entered in the marking space area 9640 at the correction areas indicated by the marks MKc entered thereon (step S670).

According to the image printing process of the sixth embodiment described above, the user of the printing apparatus 10 can request that the printing apparatus 10 perform image processing of images to be printed using an order sheet. In addition, the user of the printing apparatus 10 can specify the correction area(s) on the image using the order sheet. Therefore, the convenience of image printing using an order sheet can be improved.

G. Seventh Embodiment (Modification of Correction Levels)

The construction and operation of the printing apparatus 10 of a seventh embodiment are identical to the construction and operation of the printing apparatus 10 of the first embodiment, except that it is indicated on the order sheet whether or not the correction levels are to be modified prior to printing.

Figure 22:
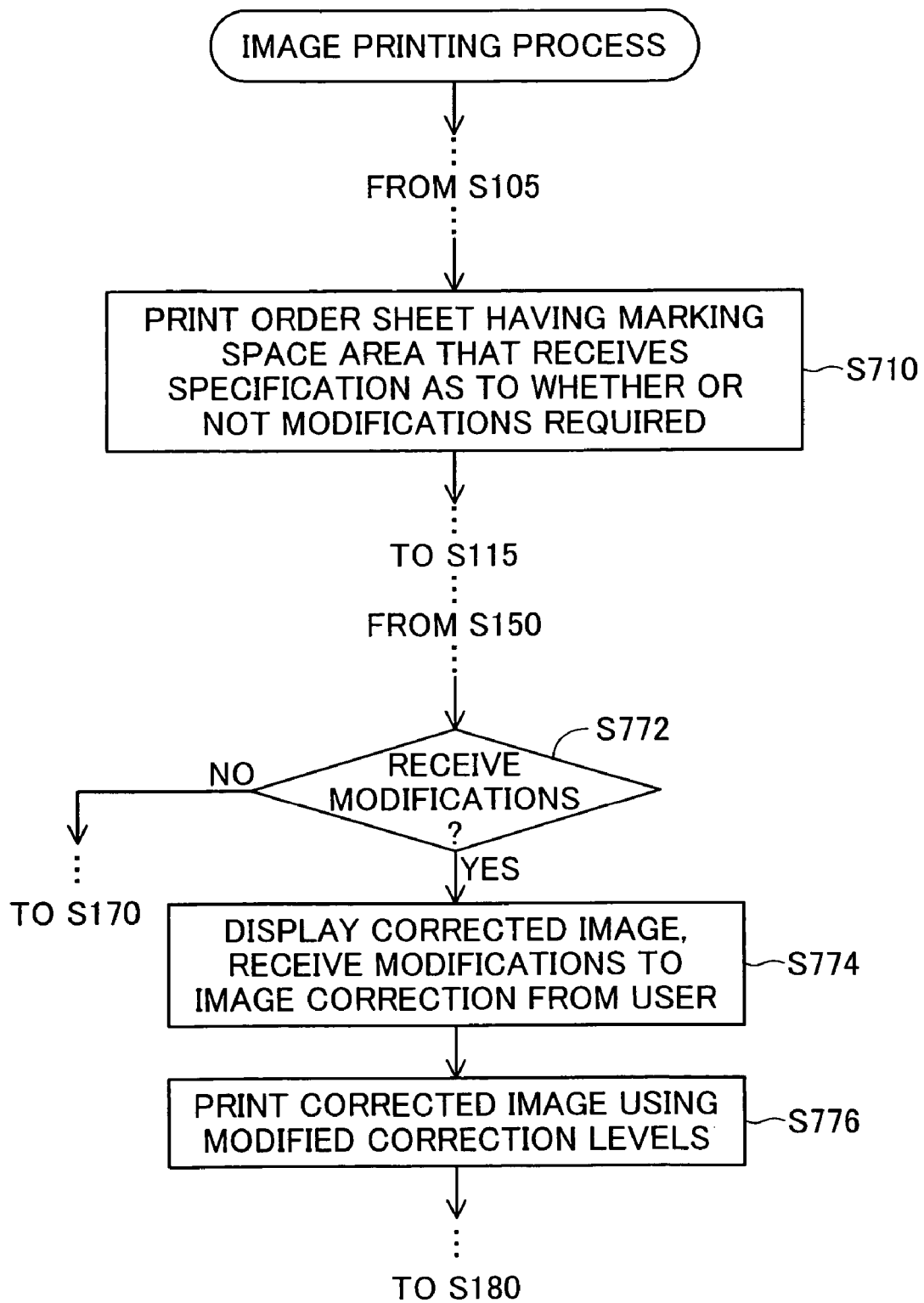
FIG. 22 is a flow chart showing an image printing process executed by the main controller 110 of the printing apparatus 10 of a seventh embodiment.

FIG. 22 is a flow chart showing an image printing process executed by the main controller 110 of the printing apparatus 10 of the seventh embodiment. After the image data is read out in the same manner as in the first embodiment (step S105), the main controller 110 of the printing apparatus 10 instructs the printing unit 120 to print an order sheet that receives entry regarding whether or not modification of the correction levels is required (step S710).

FIG. 23 is an explanatory drawing showing an example of the order sheet 970 printed by the main controller 110 of the seventh embodiment. The order sheet 970 of FIG. 21 is identical to the order sheet 910 of the first embodiment, except that it has a marking space area 9740 that receives input regarding whether or not the correction levels are to be modified prior to printing.

Returning to FIG. 22, where it is determined that a mark MK is recognized in the marking space areas that receive specification of correction levels (step S150) as well as in the marking space area 9740 (step S772), the main controller 110 displays the corrected image on the display unit 160, and modification of the correction levels is received from the user via the input button 170 (step S774). The main controller 110 then executes printing of the corrected image that reflects the correction level modifications received from the user (step S776).

According to the image printing process of the seventh embodiment described above, the user of the printing apparatus 10 can request that the printing apparatus 10 perform image processing of images to be printed using an order sheet. In addition, the user of the printing apparatus 10 can obtain a printing of images to which desired image correction is performed while checking the index images to which image correction has been performed and instructing that such image correction be modified. Furthermore, the user of the printing apparatus 10 can select whether or not he will modify the corrected images using the order sheet. Therefore, the convenience of image printing using an order sheet can be improved.

H. Eighth Embodiment (Specification of Types of Correction For Sample Image)

The construction and operation of the printing apparatus 10 of an eighth embodiment are identical to the construction and operation of the printing apparatus 10 of the first embodiment, except that after selection of the types of image correction to be performed to a set of sample images is received using an order sheet, a different order sheet that displays the set of sample images is printed.

Figure 24:
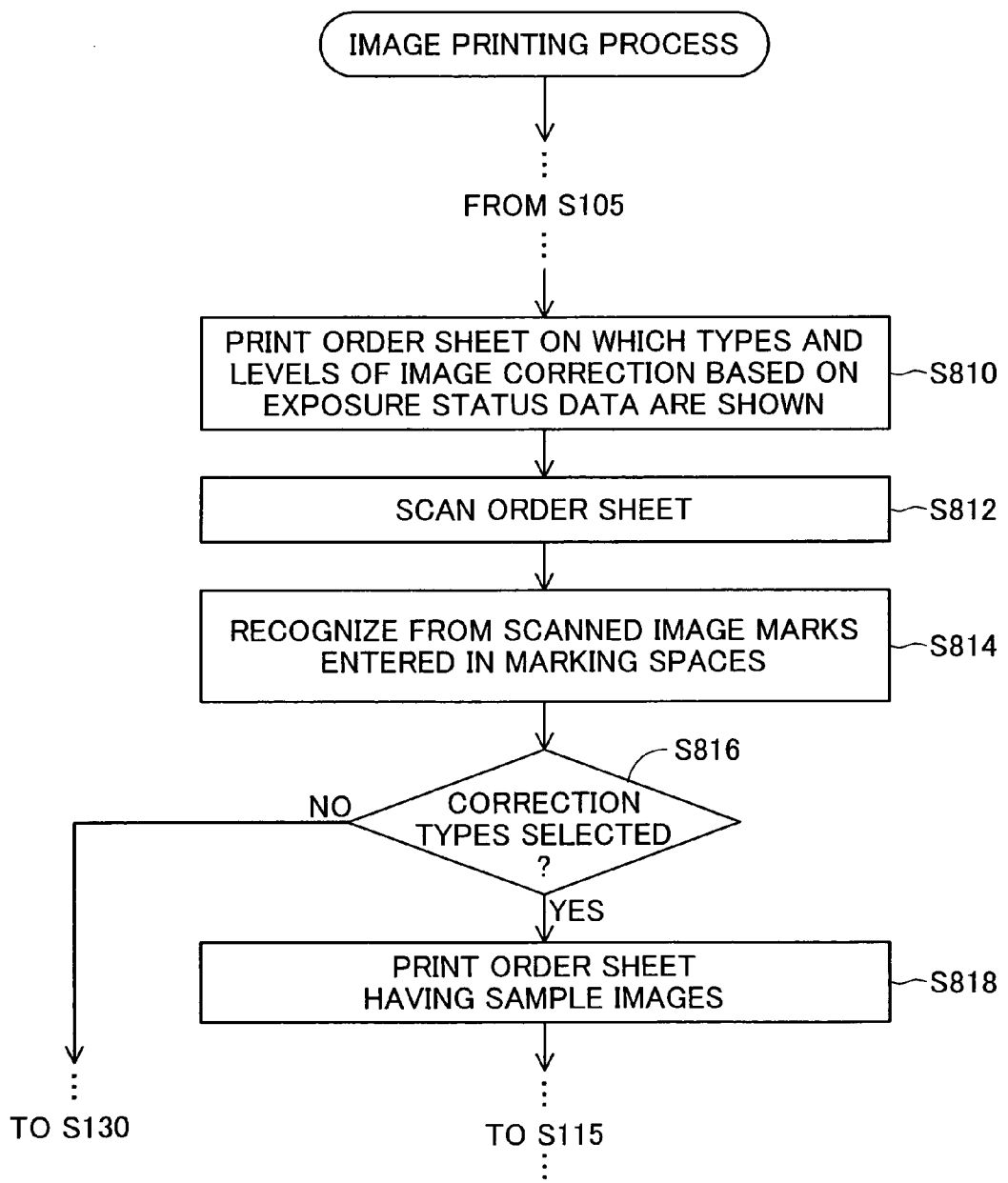
FIG. 24 is a flow chart showing an image printing process executed by the main controller 110 of the printing apparatus 10 of an eighth embodiment.

FIG. 24 is a flow chart showing an image printing process executed by the main controller 110 of the printing apparatus 10 of the eighth embodiment. After the image data is read out in the same manner as in the first embodiment (step S105), the main controller 110 of the printing apparatus 10 instructs the printing unit 120 to print an order sheet on which the types and levels of image correction based on the exposure status data included in the read-out image data are displayed, as in the third embodiment (step S810).

Figure 25:
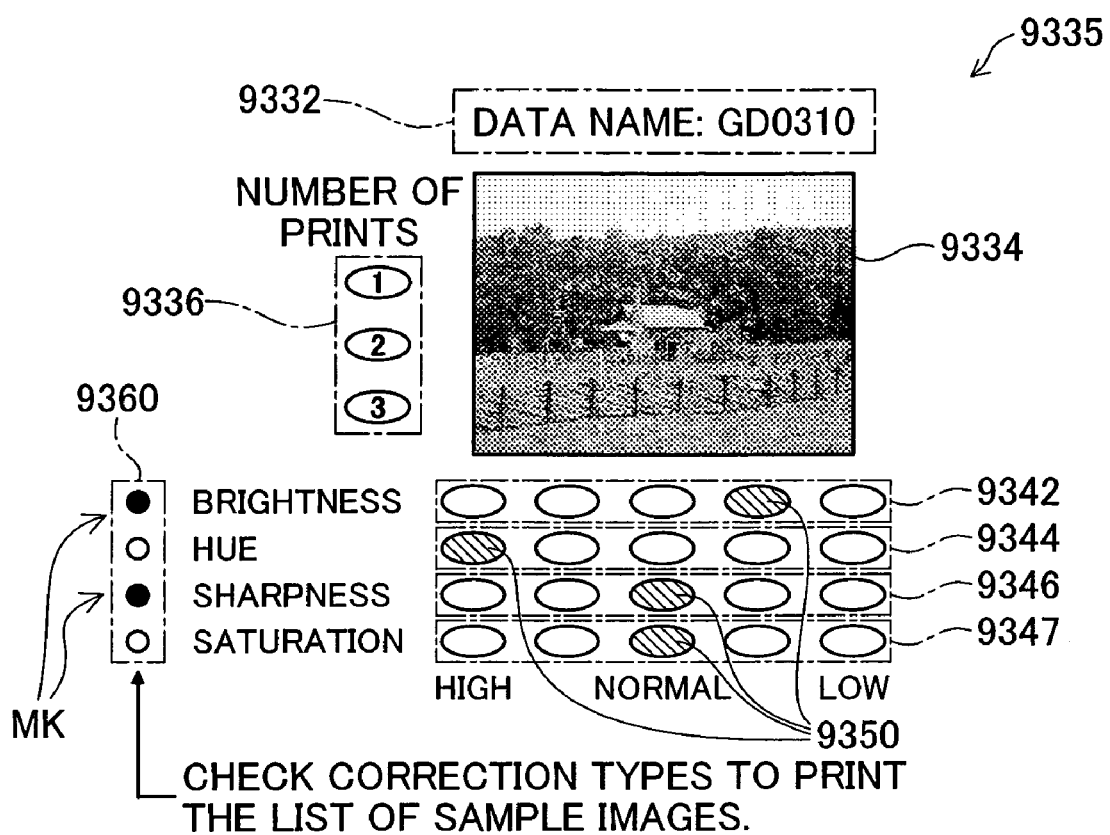
FIG. 25 is an explanatory drawing showing an entry area 9335 of the order sheet of the eighth embodiment.

FIG. 25 is an explanatory drawing showing an entry area 9335 of the order sheet of the eighth embodiment. The entry area 9335 of the order sheet of the eighth embodiment is identical to the entry area 9330 shown in FIG. 12, except that it has marking space areas 9342, 9344, 9346, 9347 that receive specification of correction levels for image correction to be performed to the image to be printed, as well as a marking space area 9360 that has marking spaces that correspond to these respective marking space areas and receives selection of the types of image correction to be performed. In the example shown in FIG. 25, 'Brightness', 'Hue', 'Sharpness' and 'Saturation' are shown as available types of image correction.

Returning to FIG. 24, after the order sheet is printed (step S810), the main controller 110 scans the order sheet filled out by the user (step S812) and recognizes the marks MK entered in the entry area 9335 (step S814). The main controller 110 then determines whether or not one or more correction types is selected, i.e., whether or not one or more marks MK is present in the marking space area 9360 that receives selection of the types of image correction (step S816).

Where one or more types of image correction is selected, i.e., where one or more marks MK exists in the marking space area 9360 (step S816), the main controller 110 prints a different order sheet on which are shown sample images that have undergone the types of image correction corresponding to the entered marks MK (step S818).

In this embodiment, where the two correction types of 'Brightness' and 'Sharpness' are specified, as in the example shown in FIG. 25, a set of sample images 9440 is displayed such that they are aligned vertically in the order of level of correction regarding one type of image correction while aligned horizontally in the order of level of correction regarding the other type of image correction, as in the case of the order sheet shown in FIG. 14.

Figure 26:
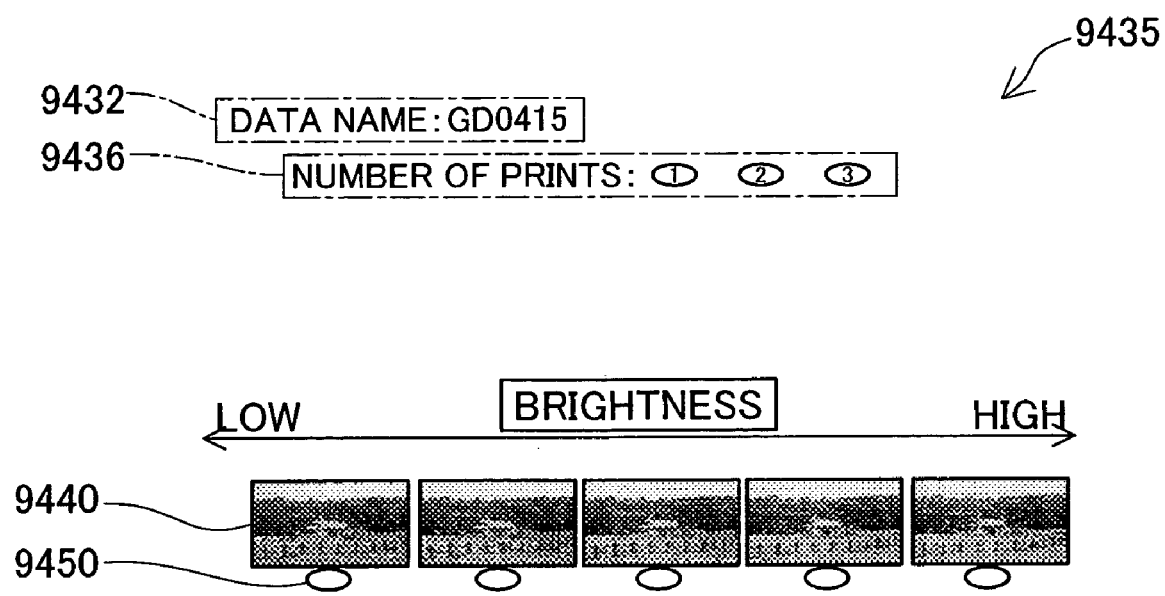
FIG. 26 is an explanatory drawing showing an entry area 9435 of the order sheet when one type of correction has been specified in the eighth embodiment.

FIG. 26 is an explanatory drawing showing an entry area 9435 of the order sheet of the eighth embodiment where a single type of correction is specified. In the example of FIG. 26, 'Brightness' is specified as the correction type, and a set of sample images 9440 is shown such that the correction level for image correction increases as one moves rightward along the row. FIG. 26 shows a case in which 'Brightness' is specified as the correction type, but it is alternatively acceptable if, where the printing apparatus 10 includes an automatic image quality adjustment function that automatically adjusts the image quality of the image to be printed to an appropriate level, for example, the printing apparatus 10 receives an image printing instruction using an order sheet on which is shown a set of sample images 9440 having changed 'Automatic image quality adjustment' correction levels.

Where two or more marks MK are entered in the marking space area 9360 that receives selection of the types of image correction, it is acceptable if sample images 9440 are generated for the two topmost correction types from among the selected items, or if sample images 9440 are generated for the correction types having the highest priority according to a preset priority scheme for correction types.

According to the image printing process of the eighth embodiment described above, the user of the printing apparatus 10 can, using an order sheet, request the printing of a different order sheet on which a set of sample images 9440 is shown, as well as select the types of correction to be performed to this set of sample images 9440.

I. Other Embodiment

Figure 27:
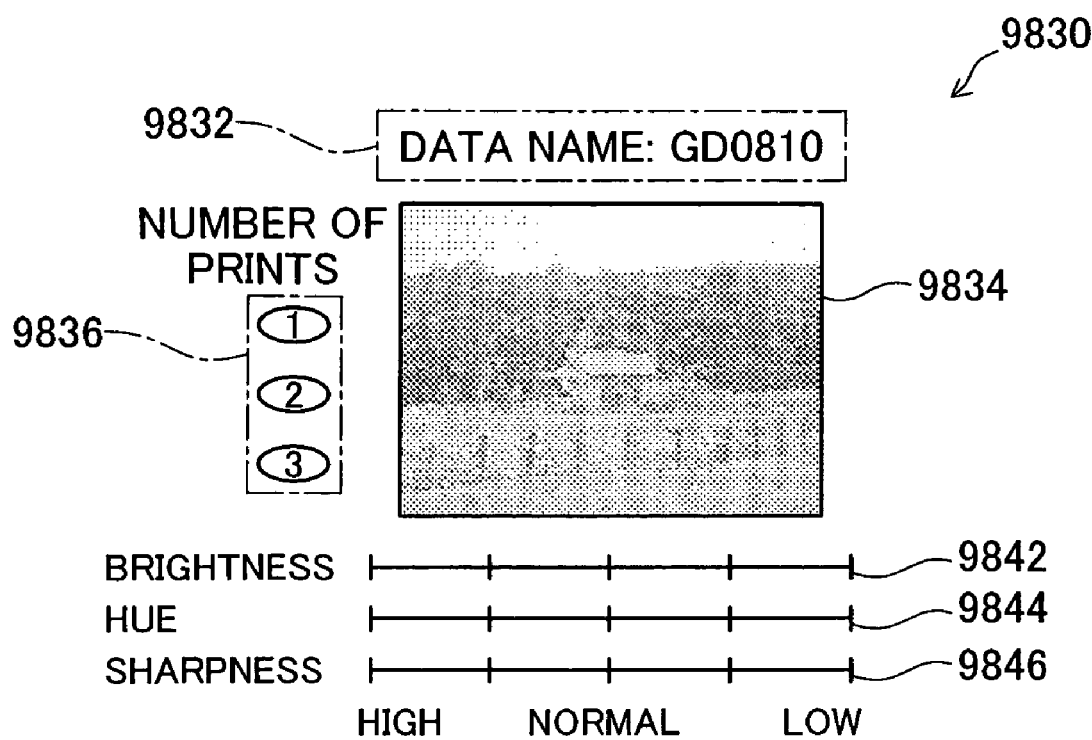
FIG. 27 is an explanatory drawing showing the entry area 9830 of a different embodiment.
Figure 28:
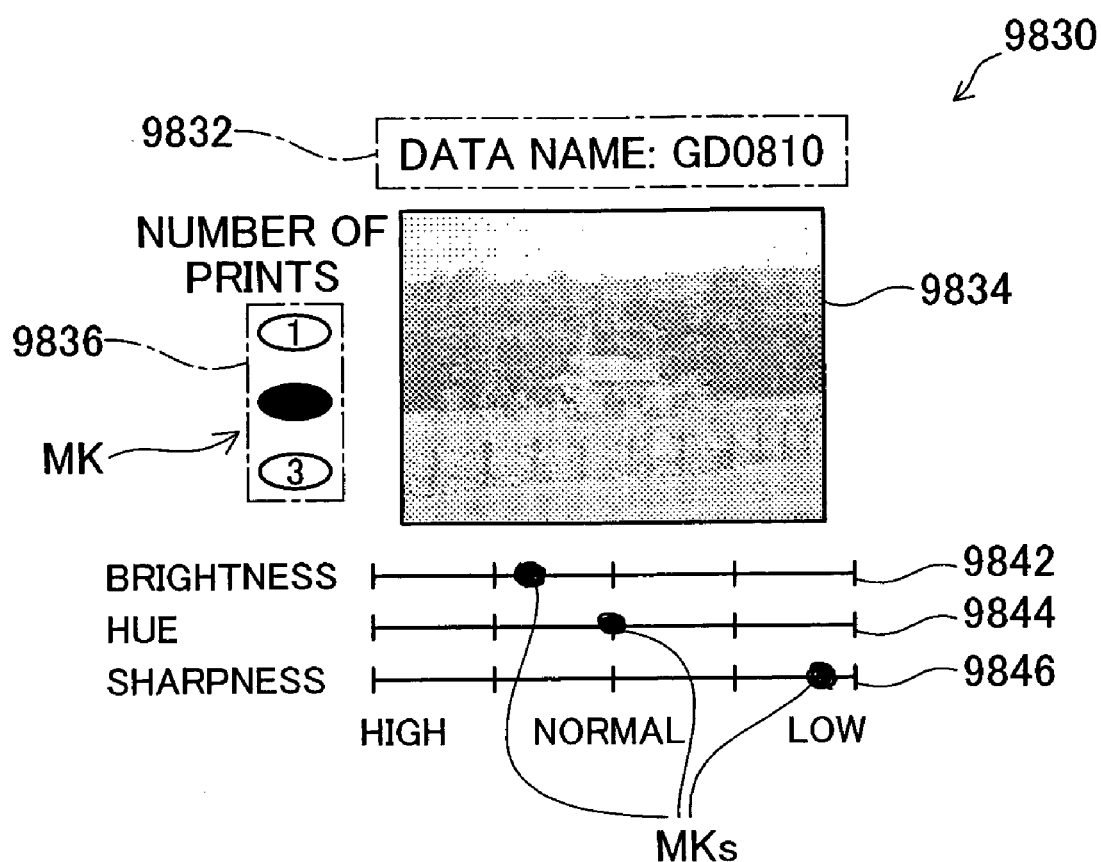
FIG. 28 is an explanatory drawing showing the entry area 9830 shown in FIG. 24 on which information used to print an image is entered by the user in the different embodiment.

While embodiments of the invention were described above, the invention is not limited to these embodiments, and naturally may be realized in various forms falling within the scope of the claims herein and not deviating from the essential scope of the invention. For example, the marking space areas that receive specification of correction levels need not comprise a group of ovals arranged in order, and may comprise graduated lines, or frames in which a number is entered. FIG. 27 is an explanatory drawing showing an entry area 9830 of a different embodiment. FIG. 28 is an explanatory drawing showing the entry area 9830 of the different embodiment shown in FIG. 27 in which information used for printing of the image is entered by the user. In FIGS. 27 and 28, the marking space areas 9842, 9844, 9846 are graduated lines, and a round mark MKs is entered by hand on the line, as shown in FIG. 28. Furthermore, the invention may be applied in a computer system that includes a personal computer, printing apparatus and scanning device, where image data stored on the personal computer is to be printed using the printing apparatus.

Figure 29:
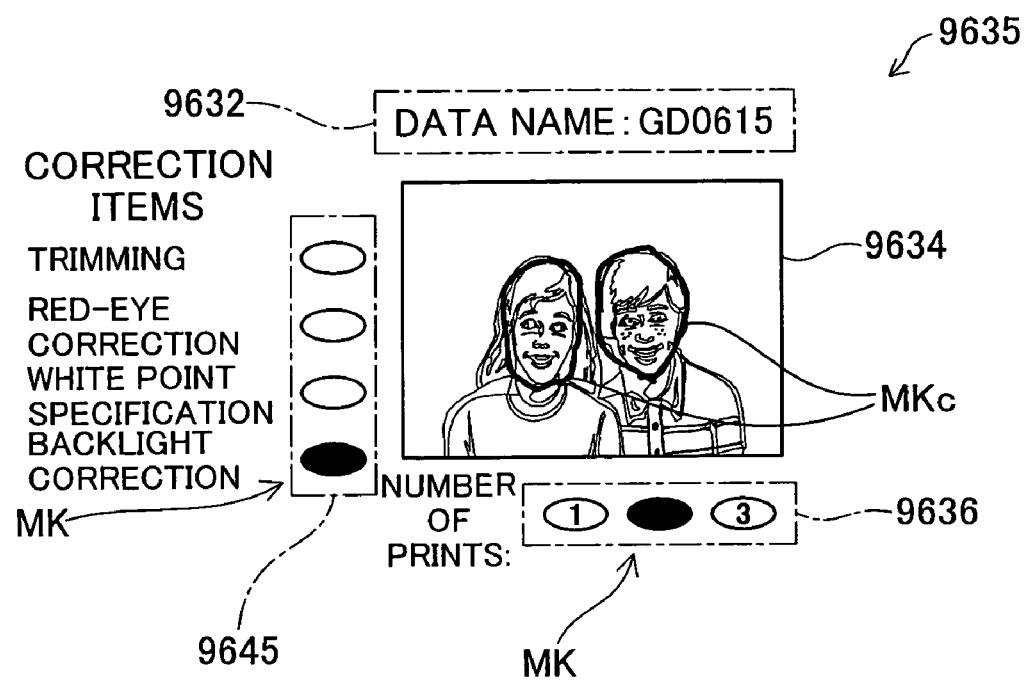
FIG. 29 is an explanatory drawing showing an entry area 9635 of the order sheet of a still different embodiment on which backlight correction can be specified.

In the sixth embodiment, it is acceptable if 'Backlight correction' is added to 'Trimming', 'Red-eye correction' and 'White point specification' as a type of image correction. FIG. 29 is an explanatory drawing showing an entry area of an order sheet of a different embodiment in which backlight correction can be specified. The entry area 9635 is identical to the entry area 9630 of the sixth embodiment shown in FIG. 20, except that it includes a marking space area 9645 that receives specification of the types of image correction. The marking space area 9645 comprises four ovals vertically aligned that correspond to the four types of image correction of 'Trimming', 'Red-eye correction', 'White point specification' and 'Backlight correction', respectively. In the example of FIG. 29, a mark MK indicating 'Backlight correction' is entered as a type of image correction in the marking space area 9645 that receives specification of the image correction types, and marks MKc that surround the faces of the persons who appear dark due to being backlit in the photo are entered directly on the index image 9634. In this embodiment, the degree of backlight correction is selected based on the brightness and darkness of the skin color areas surrounded by the marks MKc.

What is claimed is:

1. A printing method for printing an image based on image data, the printing method comprising:
   loading the image data from a storage medium in which the image data is stored;
   printing an order sheet, wherein the order sheet includes an index image representing the loaded image data to receive from a user entry of information for printing the image;
   recognizing the information entered in the order sheet via scanning of the printed order sheet; and
   printing a corrected image made by executing image correction to the image based on the recognized entered information.

2. The printing method according to claim 1, wherein the executed image correction includes at least one of contrast correction, sharpness correction, brightness correction, saturation correction, color temperature correction, color depth correction, color tone correction, red-eye correction and trimming correction.

3. The printing method according to claim 1, wherein the executed image correction includes backlight correction.

4. The printing method according to claim 1,
   wherein the printing the order sheet includes:
      evaluating an image quality level of the image based on the image data, and
      incorporating an index indicating the evaluated image quality level in the order sheet.

5. The printing method according to claim 4, wherein the evaluated image quality level includes at least one of evaluation items of blur, wobble, exposure and noise.

6. The printing method according to claim 1, wherein:
   the printing the order sheet includes incorporating, in the order sheet, a plurality of marking space areas corresponding to a plurality of correction levels for the image correction;
   the recognizing the entered information includes recognizing, as the entered information, a mark entered in the marking space area; and
   the printing the corrected image includes generating the corrected image by executing the image correction at the correction level corresponding to the marking space area in which the entered mark is recognized.

7. The printing method according to claim 1, wherein:
   the loading the image data includes loading shooting condition data indicating condition when the image is shot, wherein the shooting condition data is included in the image data; and
   the printing the order sheet includes the incorporating, in the order sheet, a representation for representing condition of image correction executed to the image based on the loaded shooting condition data.

8. The printing method according to claim 7, wherein the loaded shooting condition data includes Exif (Exchangeable image file format) data.

9. The printing method according to claim 1, wherein:
   the printing the order sheet includes:
      incorporating, in the order sheet, as the index images, a plurality of sample images made by performing image correction to the image in a plurality of manners; and
      incorporating, in the order sheet, a plurality of marking space areas corresponding to the plurality of sample images;
   the recognizing the entered information includes recognizing, as the entered information, a mark entered in the marking space area; and
   the printing the corrected image includes generating the corrected image by executing the image correction performed to the sample image corresponding to the marking space area in which the entered mark is recognized.

10. The printing method according to claim 9,
    wherein the incorporating the plurality of sample images includes:
       generating the plurality of sample images made by performing at least one of two types of the image correction at a plurality of correction levels; and
       incorporating, in the order sheet, the plurality of generated sample images with arrangement in order of the plurality of correction levels.

11. The printing method according to claim 1, wherein:
    the printing the order sheet includes incorporating, in the order sheet, a marking space area corresponding to a type of the image correction;
    the recognizing the entered information includes recognizing, as the entered information, a mark entered in the marking space area; and
    the printing the corrected image includes generating the corrected image by executing the image correction of the type corresponding to the marking space area in which the entered mark is recognized.

12. The printing method according to claim 11, wherein the printing the corrected image includes receiving from the user selection of a level of the image correction to be executed for the corrected image prior to printing of the corrected image.

13. The printing method according to claim 1, wherein:
the recognizing the entered information includes recognizing, as the entered information, a mark entered on the index image; and
the printing the corrected image includes specifying, as a location on the image in which the image correction based on the recognized entered information is executed, a location on the image corresponding to a location on the index image in which the entered mark is recognized.

14. The printing method according to claim 1, wherein the printing the corrected image includes printing the corrected image immediately after the order sheet is scanned and the entered information is recognized.

15. The printing method according to claim 1,
wherein the printing the corrected image includes:
displaying the corrected image before the corrected image is printed; and
receiving modification to the corrected image from the user before the corrected image is printed.

16. The printing method according to claim 15, wherein the printing the corrected image includes determining, based on the recognized entered information, whether or not the modification to the corrected image is to be received from the user before the corrected image is printed.

17. A printing apparatus printing an image based on image data, the printing apparatus comprising:
an image reader that reads out image data from a storage medium on which the image data is stored;
an image loading unit that loads the image data from a storage medium in which the image data is stored;
an order sheet print control unit that controls printing an order sheet, wherein the order sheet includes an index image representing the loaded image data to receive from a user entry of information for printing the image;
a scan recognition unit that recognizes the information entered in the order sheet via scanning of the printed order sheet; and
a corrected image print control unit that controls printing a corrected image made by executing image correction to the image based on the recognized entered information.

18. A computer readable recording medium, in which a computer program is recorded, the computer program causing a computer to print an image based on image data, the computer program causing the computer to attain functions of:
loading the image data from a storage medium in which the image data is stored;
controlling printing an order sheet, wherein the order sheet includes an index image representing the loaded image data to receive from a user entry of information for printing the image;
recognizing the information entered in the order sheet via scanning of the printed order sheet; and
controlling printing a corrected image made by executing image correction to the image based on the recognized entered information.

* * * * *